United States Patent
Donnay et al.

(10) Patent No.: US 10,173,237 B2
(45) Date of Patent: Jan. 8, 2019

(54) APPARATUS AND METHOD FOR BUILDING A PRODUCT FROM A BASE MEMBER AND ONE OR MORE ATTACHING MEMBERS

(71) Applicant: Android Industries LLC, Auburn Hills, MI (US)

(72) Inventors: John Edward Donnay, West Bloomfield, MI (US); Robert Michael Lease, Washington, MI (US); Christopher Dean Kirkum, Shelby Township, MI (US); Stephen Ju, Rochester, MI (US)

(73) Assignee: Android Industries LLC, Auburn Hills, MI (US)

( * ) Notice: Subject to any disclaimer, the term of this patent is extended or adjusted under 35 U.S.C. 154(b) by 311 days.

(21) Appl. No.: 15/014,768

(22) Filed: Feb. 3, 2016

(65) Prior Publication Data
US 2016/0236738 A1    Aug. 18, 2016

Related U.S. Application Data

(60) Provisional application No. 62/115,480, filed on Feb. 12, 2015.

(51) Int. Cl.
| | |
|---|---|
| *B62D 65/14* | (2006.01) |
| *B60R 13/02* | (2006.01) |
| *B05C 5/02* | (2006.01) |
| *F16B 11/00* | (2006.01) |

(52) U.S. Cl.
CPC .......... *B05C 5/0212* (2013.01); *F16B 11/006* (2013.01); *B05C 5/0216* (2013.01); *B60R 13/0212* (2013.01); *B62D 65/14* (2013.01)

(58) Field of Classification Search
CPC ............ B60R 13/0212; B60R 13/0218; B60R 13/0225; B60R 13/0231; B62D 65/14
See application file for complete search history.

(56) References Cited

U.S. PATENT DOCUMENTS

2010/0060042 A1* 3/2010 Budek .................. B23P 19/008
  296/214
2015/0307146 A1* 10/2015 Huelke ................ B25H 1/0007
  700/114

* cited by examiner

*Primary Examiner* — Carson Gross
(74) *Attorney, Agent, or Firm* — Honigman Miller Schwartz and Cohn LLP

(57) ABSTRACT

An apparatus capable of building products including an adhesive application member, which is capable of applying an adhesive to a first base member along a first predetermined pattern and to a second base member along a second predetermined pattern, and a tooling block, which is capable of receiving a first set of one or more attaching members and applying the first set of one or more attaching members to the first base member and is capable of receiving a second set of one or more attaching members and applying the second set of one or more attaching members to the second base member. The apparatus is capable of building products of differing design aspects without significant changes to the apparatus's components. The apparatus may also associate with a universal product mover capable of transporting products of varying designs.

9 Claims, 27 Drawing Sheets

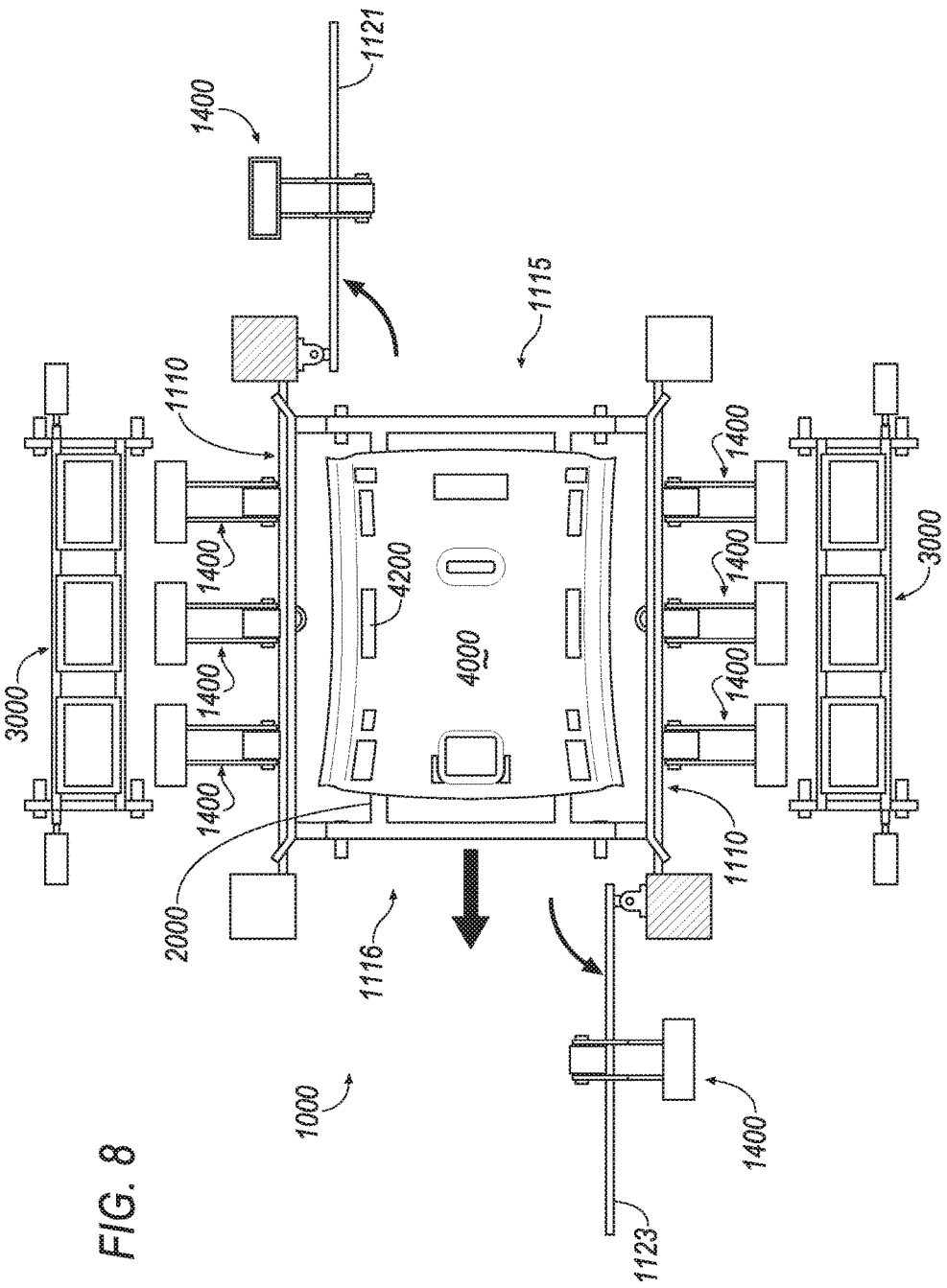

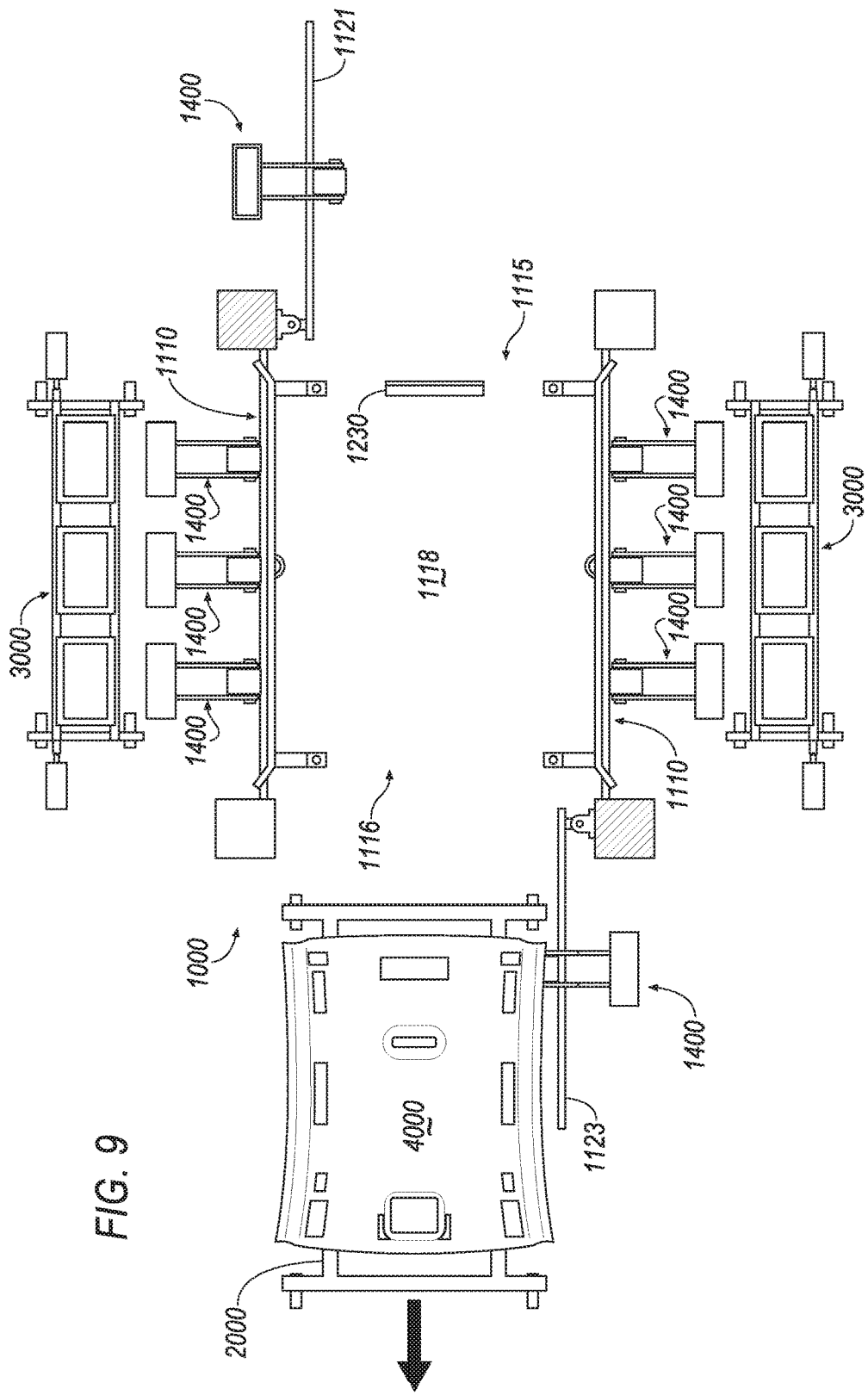

APPARATUS AND METHOD FOR BUILDING A PRODUCT FROM A BASE MEMBER AND ONE OR MORE ATTACHING MEMBERS

RELATED APPLICATION

This disclosure claims priority to U.S. Provisional Patent Application Ser. No. 62/115,480 filed on Feb. 12, 2015.

TECHNICAL FIELD

This disclosure relates to the field of building products, such as automobile headliners.

BACKGROUND

Numerous products include one or more attaching members that are attached to an associated base member. Oftentimes, manufacturing precision is required when attaching the one or more attaching members to the associated base member.

One product requiring manufacturing precision is automobile headliners. Headliners, located at the interior side of the roof of vehicles, serve multiple safety, aesthetic, and functional purposes. The geometry of headliners varies greatly between vehicle models. Even within a single vehicle model, headliners vary between model years. Even within a single vehicle model of a single model year, headliners vary to accommodate features such as moon roofs or overhead consoles. Examples of geometry-changing particularities between headliners include their width, their length, the necessary connections, openings within the headliners, and their fittings.

Before a headliner is installed into a new vehicle, a headliner builder constructs the headliner. Maintenance of exact dimensions of headliner geometry is important to allow for a perfect fit into the vehicle framing. Additionally, the placement of fittings and connections is critical. One such set of fittings requiring precise placement on the headliner are head impact countermeasures; these non-expanding, deformable cushions built into automobile headliners are required fixtures within many vehicles.

Other fittings that are attached to automobile headliners includes magnets and overhead console reinforcement fittings.

SUMMARY

Hand-connecting one or more attaching member, such as one or more head impact countermeasure, at precise locations along a base member, such as an automobile headliner, constitutes a tedious and time-consuming process. However, automated cells to handle base members with multiple differing designs have not proven cost-effective. To address a long-felt need in the art, this invention presents an apparatus and method for building a product with a base member and one or more attaching member.

The invention presented allows for a single cell to handle base members of varying designs and to apply various attaching members which adhere to the base member at locations that differ from a base member of one design to a base member of another design. As described hereinafter, replacement of a quick-disconnect tooling is the only change of components required at the cell when a base member of a new design is to be handled by the cell.

Although the transportation of the base members associated with the invention is not limited to a transporting cart, the invention also presents a transporting cart capable of transporting headliners of varying designs. Only the supporting portion of the transporting cart is replaced when the transporting cart begins transporting a base member of a new design.

One aspect of the disclosure provides an apparatus for building products. The apparatus includes an adhesive application member and a tooling block. The adhesive application member is capable of applying an adhesive to a first base member along a first predetermined pattern. The adhesive application member is also capable of applying an adhesive to a second base member along a second predetermined pattern. The tooling block is capable of receiving a first set of one or more attaching member and applying the first set of one or more attaching member to the first base member. The tooling block is also capable of receiving a second set of one or more attaching member and applying the second set of one or more attaching member to the second base member. A design aspect of the first base member differs from a design aspect of the second base member. The tooling block receives a first removable tooling to handle the first set of one or more attaching members and receives a second removable tooling to handle the second set of one or more attaching members.

Implementations of the disclosure may include one or more of the following features. In some implementations a product mover moves the first and second base members into the apparatus. The product mover may receive a first supporting portion to handle the first base member and may receive a second supporting portion to handle the second base member. The product mover may comprise a cart.

In some implementations, the tooling block includes an adjustable base, a rotating arm, a quick-disconnect mechanism, and a vacuum system. The adjustable base is mobile in a first (y) direction. The quick-disconnect mechanism connects and disconnects the first and second removable tooling from the rotating arm. The vacuum system activates to maintain the first set of one or more attaching members onto the first removable tooling. The vacuum system also activates to maintain the second set of one or more attaching members onto the second removable tooling.

The apparatus may further comprise more than one tooling block. Each tooling block is capable of receiving a first removable tooling and a second removable tooling. Each first removable tooling receives a first-tooling-associated one or more attaching member and applies the first-tooling-associated one or more attaching member to the first base member. Each second removable tooling receives a second-tooling-associated one or more attaching member and applies the second-tooling-associated one or more attaching member to the second base member.

In some implementations the first and second base members are automobile headliners. In other implementations, the first and second sets of one or more attaching member are sets of one or more head impact countermeasure.

Another aspect of the disclosure provides a device that includes an adjustable base, a rotating arm, a quick-disconnect mechanism, and a vacuum system. The adjustable base is mobile in a first (y) direction. The quick-disconnect mechanism connects and disconnects a first and a second removable tooling from the rotating arm. The vacuum system activates to maintain a first set of one or more attaching members onto the first removable tooling. The vacuum system also activates to maintain a second set of one or more attaching members onto the second removable tooling. The first removable tooling connects to the rotating arm, which rotates to apply the first set of one or more attaching members to a first base member designed to receive the first set of one or more attaching members. The second removable tooling also connects to the rotating arm, which rotates to also apply the second set of one or more attaching members to a second base member designed to receive the second set of one or more attaching members.

Another aspect of the disclosure provides a product mover that includes a universal portion and more than one supporting portions. The universal portion is capable of moving a base member of any design. Each of the more than one supporting portions is designed to support a different specified group of base members sharing a common design. The universal portion receives and removably secures one of the supporting portions, which corresponds to the specified group of base members to be moved.

Yet another aspect of the disclosure provides a method of buildings products. The method includes receiving a first quick-disconnect tooling at a tooling block. The method also includes receiving a first set of one or more attaching member at the first quick-disconnect tooling. In addition, the method includes receiving a product mover with a first base member and engaging the first base member. Additionally, the method includes applying an adhesive to the first base member along a first pre-programmed adhesive pattern and applying the first set of one or more attaching member to the first base member at one or more pre-programmed location.

In some examples, the method may further include releasing the first quick-disconnect tooling and receiving a second quick-disconnect tooling at the tooling block. Further, the method may also include receiving a second set of one or more attaching member at the second quick-disconnect tooling. In addition, the method may also include receiving the product mover with a second base member or receiving a second product mover with a second base member and engaging the second base member. An aspect of the second base member differs from a design aspect of the first base member. Additionally, the method may also include applying the adhesive to the second base member along a second pre-programmed adhesive pattern and applying the second set of one or more attaching member to the second base member.

In some implementations of the method, the first and second base members are automobile headliners. In other implementations, the first and second sets of one or more attaching member are sets of one or more head impact countermeasure.

DESCRIPTION OF DRAWINGS

FIG. 8 is a top view of the example apparatus of FIG. 1 showing the apparatus after operation is completed.

FIG. 9 is a top view of the example apparatus of FIG. 1 showing the apparatus as the transporting cart exits.

DETAILED DESCRIPTION

An exemplary implementation of the invention is shown in FIGS. 1-16 and is embodied as a universal headliner builder.

Figure 1:
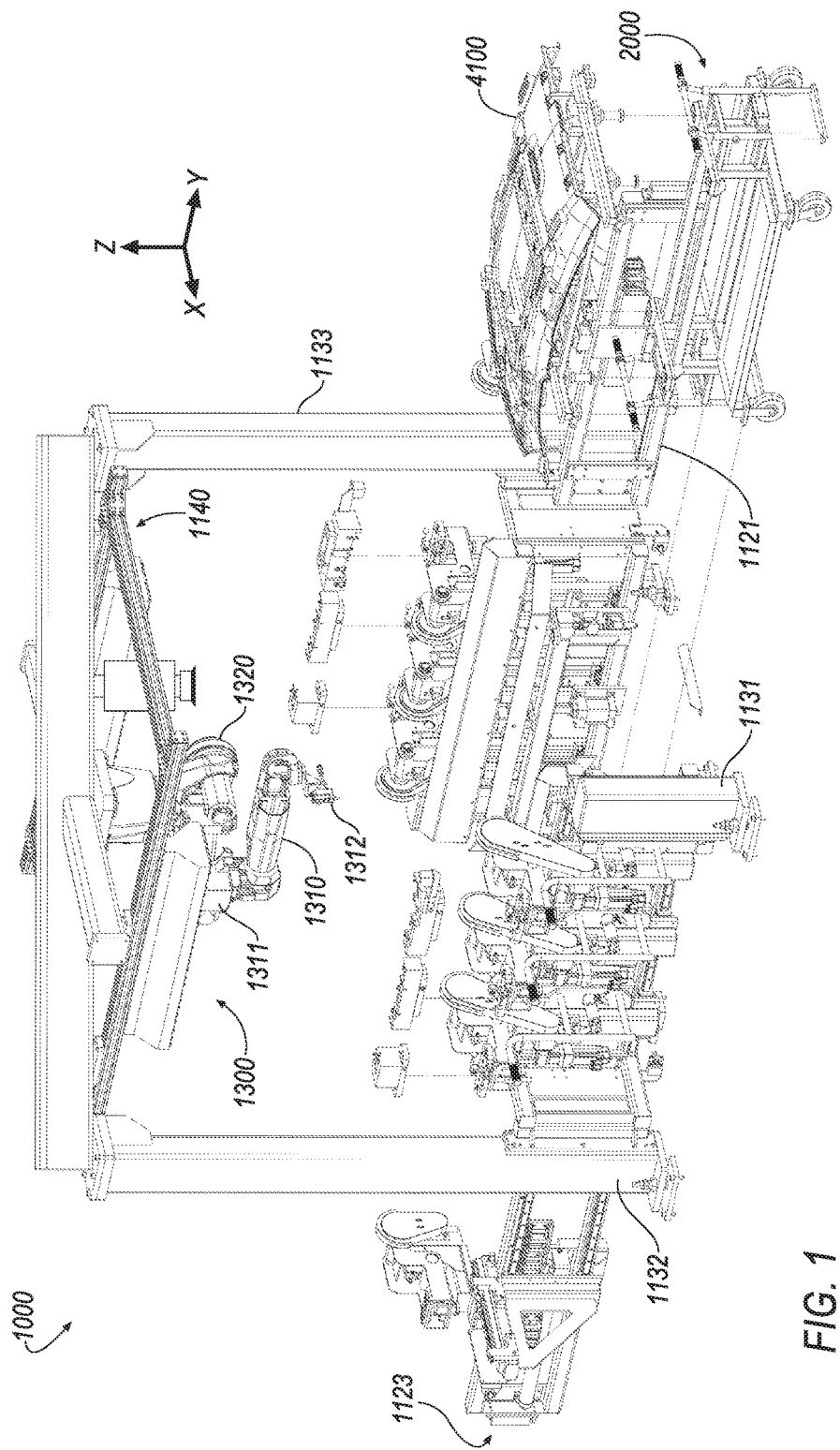
FIG. 1 is an isometric view of an example apparatus for building headliners.

Referring to FIG. 1, the invention includes a cell 1000 configured to attach one or more attaching members 4200 to a base member 4100 that is received by the cell 1000 on a transporting cart 2000. The cell is shown in FIG. 1 as including two end caps 1121, 1123, which enclose both ends of the cell 1000 after the cell 1000 has received the transporting cart 2000 and base member 4100. In alternative implementations, the cell 1000 may include only one end cap or the cell 1000 may not include an end cap.

Figure 2:
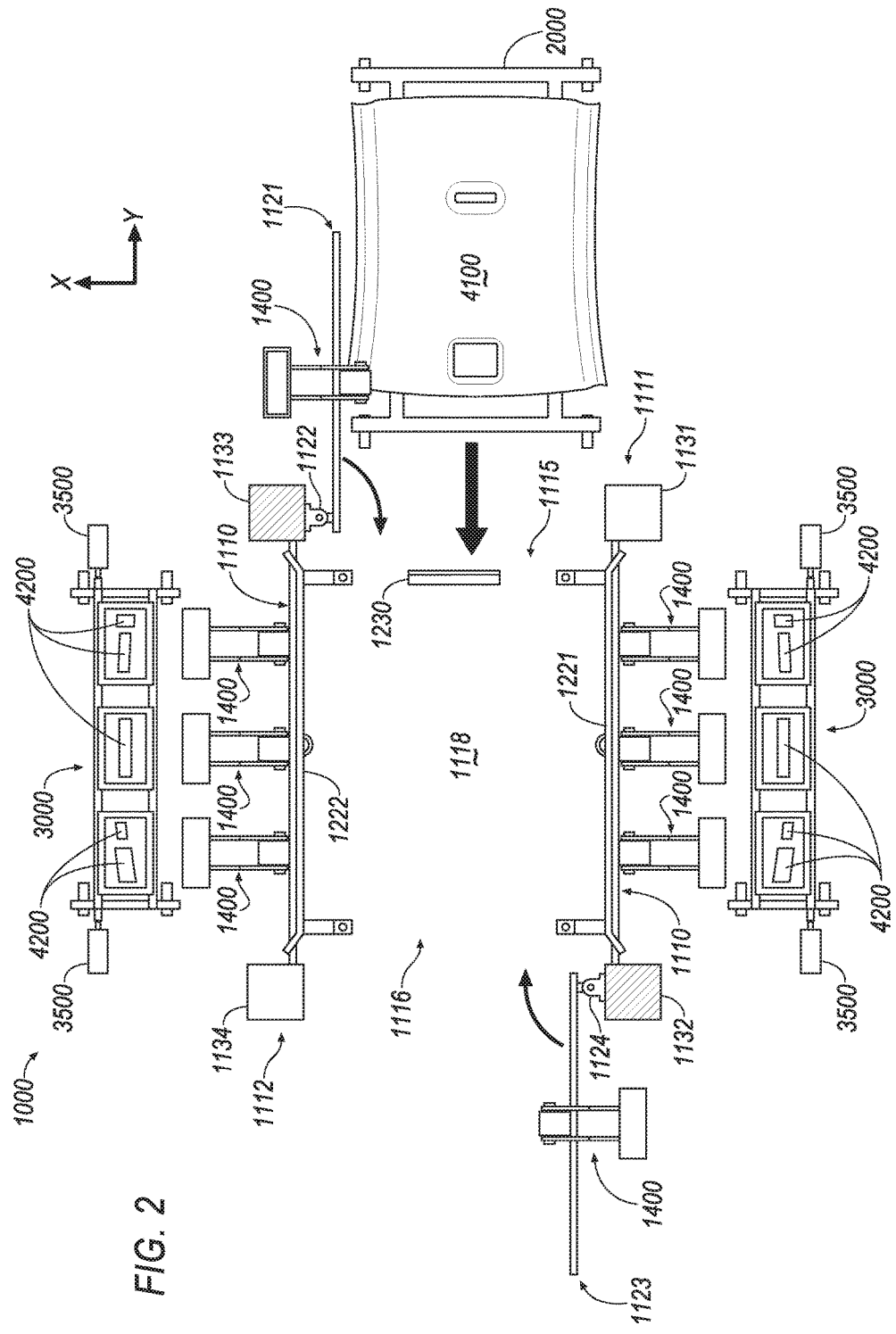
FIG. 2 is a top view of the example apparatus of FIG. 1 showing the apparatus as a transporting cart approaches.

Referring to FIG. 2, the process for building a product with a base member 4100 and one or more attaching members 4200 begins when a transporting cart 2000 and the base member 4100 approach a front end 1115 of the cell 1000.

In implementations of the cell 1000 that include a front end cap 1121, the front end cap 1121 is in an open position as the transporting cart 2000 and the base member 4100 approach the cell 1000, creating an opening at the front end 1115 of the cell 1000. The front end cap 1121 is illustrated in FIG. 2 as being pivotally coupled to structural column 1133 at a hinged component 1122. In alternate implementations, the front end cap 1121 may be pivotally coupled to structural column 1131, directly to a side wall 1110 at a first side 1111 of the cell 1000, directly to a side wall 1110 at a second side 1112 of the cell 1000, or to any other structure or member that enables the front end cap 1121 to pivot between an open position and a closed position. Further, in alternate implementations, the front end cap 1121 may be slidably attached to the cell 1000, the front end cap 1121 may be uncoupled (e.g., freely attachable and removable from the cell 1000), or the front end cap 1121 may be otherwise configured to move between an open position and a closed position.

In implementations of the cell 1000 that include a back end cap 1123, the back end cap 1123 may remain in an open position as the transporting cart 2000 and the base member 4100 approach the cell 1000 or the back end cap 1123 may have already returned to a closed position. Similar to the front end cap 1121, the back end cap 1123 is illustrated in FIG. 2 as being pivotally coupled to structural column 1132 at a hinged component 1124. In alternate implementations, the back end cap 1123 may be pivotally coupled to structural column 1134, directly to the side wall 1110 at the first side 1111 of the cell 1000, directly to the side wall 1110 at the second side 1112 of the cell 1000, or to any other structure or member that enables the back end cap 1123 to pivot between an open position and a closed position. Further, in alternate implementations, the back end cap 1123 may be slidably attached to the cell 1000, the back end cap 1123 may be uncoupled (e.g., freely attachable and removable from the cell 1000), or the back end cap 1123 may be otherwise configured to move between an open position and a closed position.

When the transporting cart 2000 and the base member 4100 approach the front end 1115 of the cell 1000, one or more product carts 3000, which retain the one or more attaching members 4200, may already be in place between one or more corresponding product cart retaining structures 3500. Each of the one or more product carts 3000 retain attaching members 4200 that correspond to the particular base member 4100 being handled by the cell 1000. The one or more product carts 3000 need not be in place before the transporting cart 2000 and base member 4100 approach the front end 1115 of the cell 1000; the product carts 3000 need only be place in time to supply the one or more attaching members 4200 before the cell 1000 begins operation.

As discussed hereinafter, the implementations of the invention that include the one or more product carts 3000 include an increased level of confidence that the correct one or more attaching members 4200 are attached to the base member 4100. However, in alternate implementations, the invention does not require the use of one or more product carts 3000. In these implementations, the one or more attaching members 4200 are retained elsewhere and are transported to the cell 1000 for attachment to the base member 4100 by other means.

The transporting cart 2000 and the base member 4100 approach the cell 1000 and travel into the interior volume 1118 of the cell 1000 through the opening at the front end 1115 of the cell. A first guide rail 1221 attached to the side wall 1110 at the first side 1111 of the cell 1000 and a second guide rail 1222 attached to the side wall 1110 at the second side 1111 of the cell 1000 collectively guide the transporting cart 2000 and the base member 4100 as they travel into the interior volume 1118 of the cell 1000. The first and second guide rails 1221, 1222 assure that the base member 4100 is roughly located at its operational position within the cell 1000, with respect to the x direction.

Before the transporting cart 2000 and the base member 4100 can travel through the opening at the back end 1116 of the cell, a hard stop 1230 engages a positioning member 2230 (shown in FIG. 15) of the transporting cart 2000. The engagement of the hard stop 1230 and the positioning member 2230 stops the movement of the cart in the y direction and assures that the base member 4100 is roughly located at its operational position within the cell 1000, with respect to the y direction.

Figure 3:
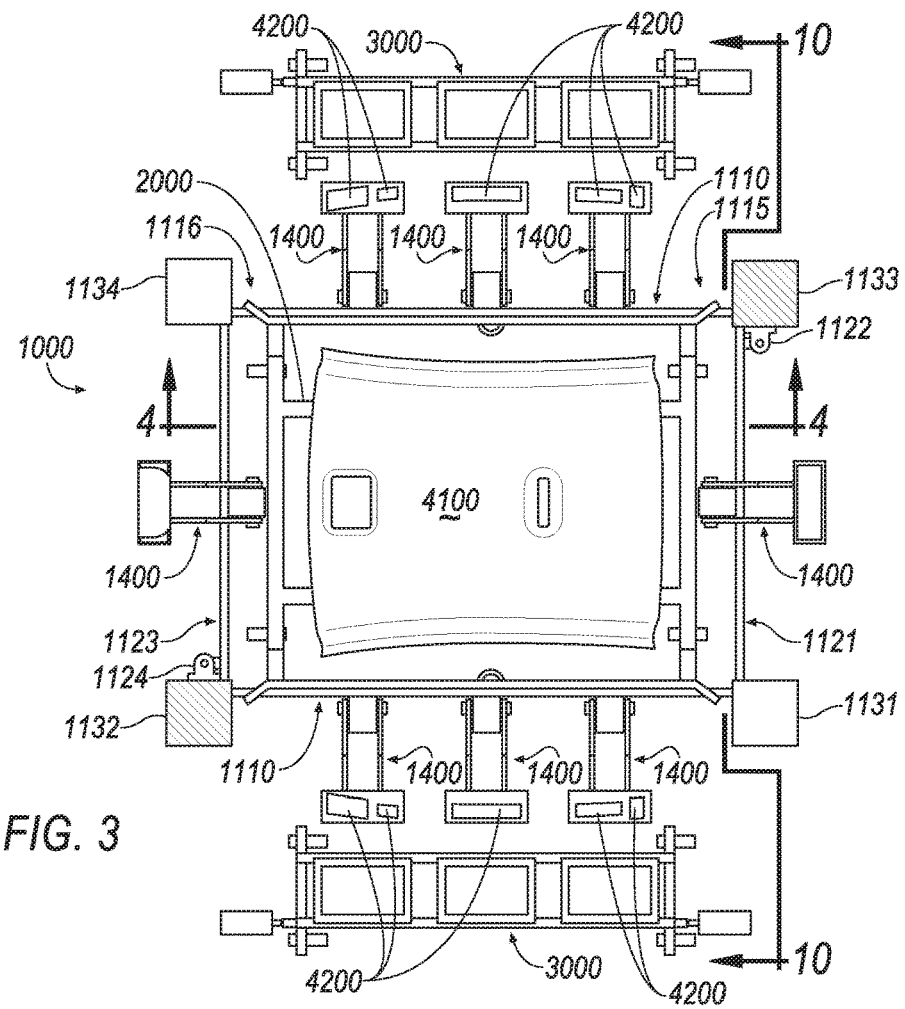
FIG. 3 is a top view of the example apparatus of FIG. 1 showing the apparatus in a ready position.
Figure 4:
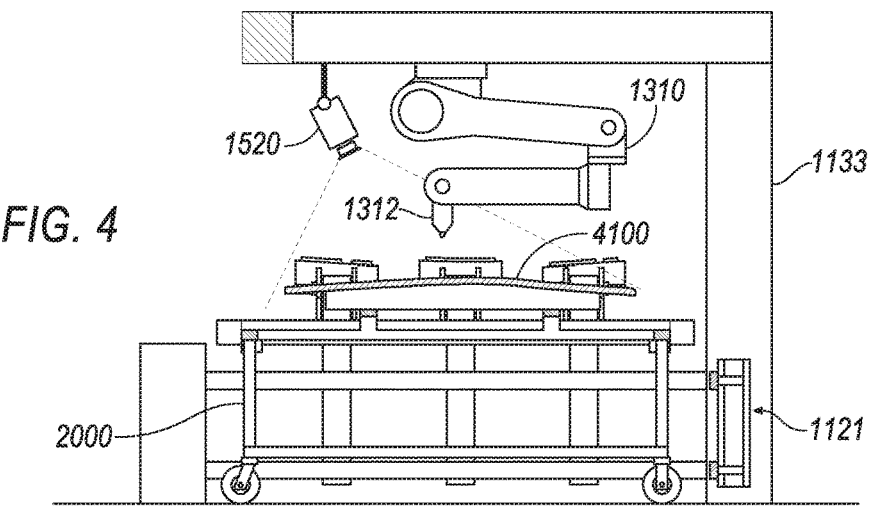
FIG. 4 is a sectional view of the example apparatus as shown in FIG. 3.

Referring to FIGS. 3-4, the process for building a product with a base member 4100 and one or more attaching members 4200 continues with the closure of the front end cap 1121 and the back end cap 1123. Additionally, the one or more attaching members 4200 relocate from the one or more product carts 3000 onto the one or more tooling blocks 1400.

As illustrated in FIG. 3, the end of the front end cap 1121 that is not attached to the hinged component 1122 pivots to a closed position at the structural column 1131. The end of the back end cap 1123 that is not attached to the hinged component 1124 pivots to a closed position at the structural column 1134. In implementations including one or more end caps with alternate designs, the one or more end caps secure at a closed position. In each implementation including a front end cap 1121 and a back end cap 1123, the closure of the end caps further assists in roughly locating the base member 4100 at its operational position within the cell 1000. Such implementations may allow for the hard stop 1230 to be omitted from the design. The front end 1115 of the cell 1000, the back end 1116 of the cell 1000, or both ends of the cell 1000 remain open in implementations that do not include an end cap or that include only one end cap. The operation of the cell can occur with either closed or open front and back ends 1115, 1116.

As illustrated in FIG. 4, once the base member 4100 is roughly positioned within the cell 1000, a vision component 1520 may confirm the rough position of the base component 4100. At this stage, the vision component 1520 may also confirm that the shape and design of the base member 4100 within the cell 1000 matches the shape and design of the base member 4100 corresponding to the transporting cart 2000 that has entered the cell 1000. While both of these confirmations provide additional confidence that the process is proceeding as expected, in alternate designs the cell 1000 may only conduct one of these confirmations or the cell 1000 may conduct neither of these confirmations. If the process is designed to perform neither of these confirmations, the cell 1000 may not include a vision component 1520.

Figure 5:
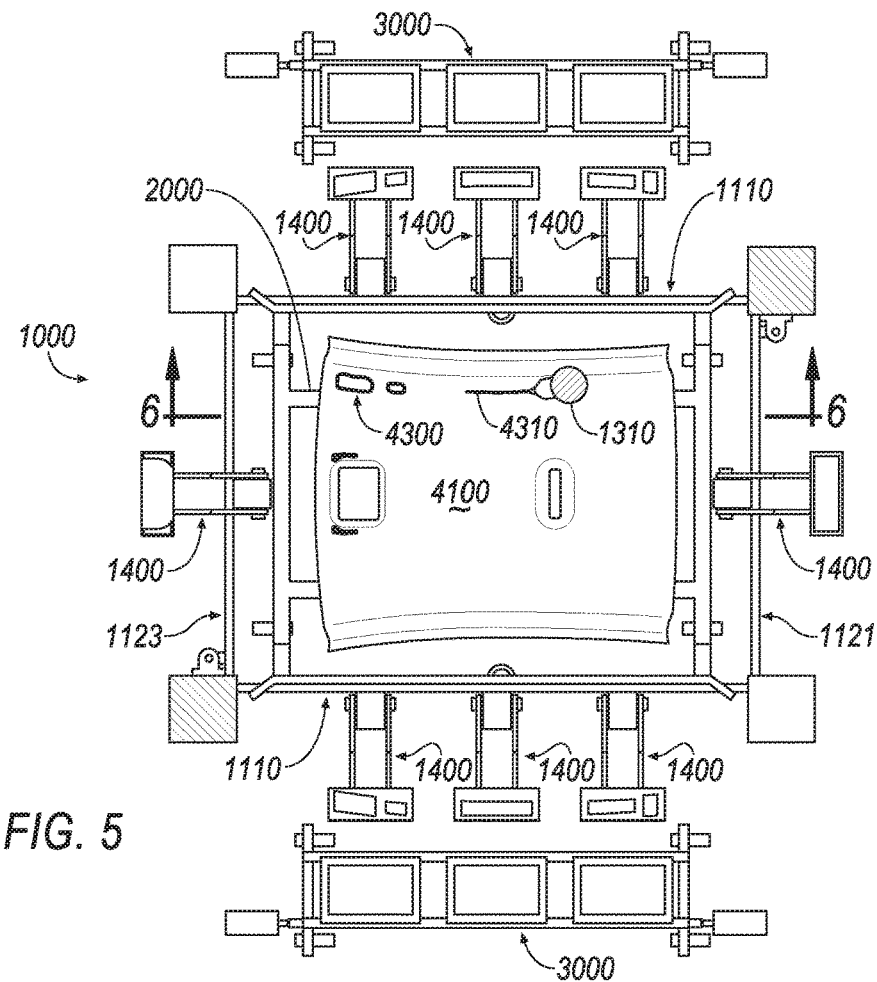
FIG. 5 is a top view of the example apparatus of FIG. 1 showing the apparatus as operation has begun.
Figure 6:
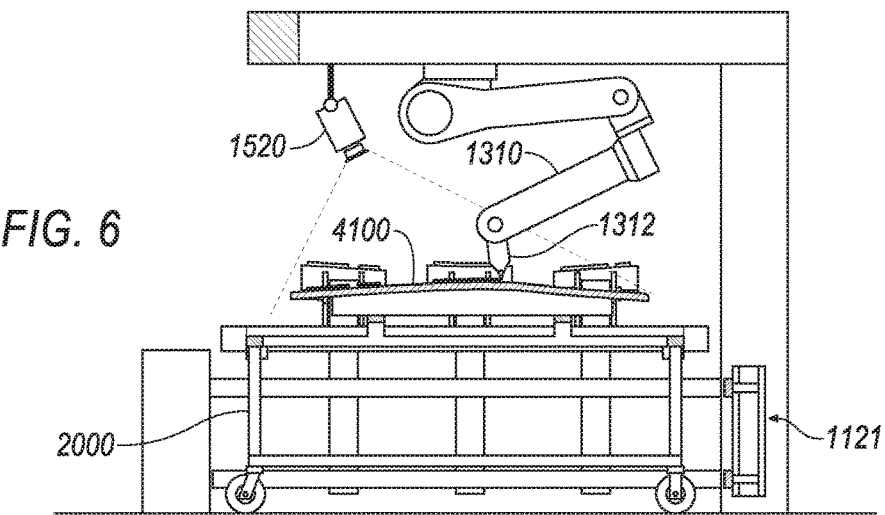
FIG. 6 is a sectional view of the example apparatus as shown in FIG. 5.

At this stage in the process for building a product with a base member 4100 and one or more attaching members 4200, before application of an adhesive 4300 begins as illustrated in FIGS. 5-6, the cell 1000 may include a mechanism to assure that free space around the cell 1000 is clear of personnel or objects. One such mechanism is a curtain 1700 (not shown) that can be drawn to a closed position, in which the curtain 1700 fully encompasses the cell 1000. The curtain 1700 may include a free-space sensor 1710 (shown in FIG. 20) that senses that the curtain 1700 resides in the closed position. However, the cell 1000 may include a free-space sensor 1710 that operates without a curtain 1700. Example alternative free-space sensors 1710 include a sensor 1710 that alerts the cell 1000 of the presence of an operator of object within a defined free space or a sensor 1710 that alerts the cell 1000 of motion within a defined free space. In alternate implementations, the cell 1000 does not include a free-space sensor 1710.

Referring to FIGS. 5-6, the process for building a product with a base member 4100 and one or more attaching members 4200 continues with the application of the adhesive 4300 to the base member 4100.

An arm 1310 positions an adhesive application member 1312 in a position that enables the adhesive application member 1312 to apply the adhesive 4300 to the base member 4100 along an adhesive pattern 4310. The particular adhesive pattern 4310 along which the adhesive application member 1312 applies the adhesive 4300 to the base member 4100 corresponds to the particular base member 4100 to which the adhesive 4300 is applied.

Figure 7:
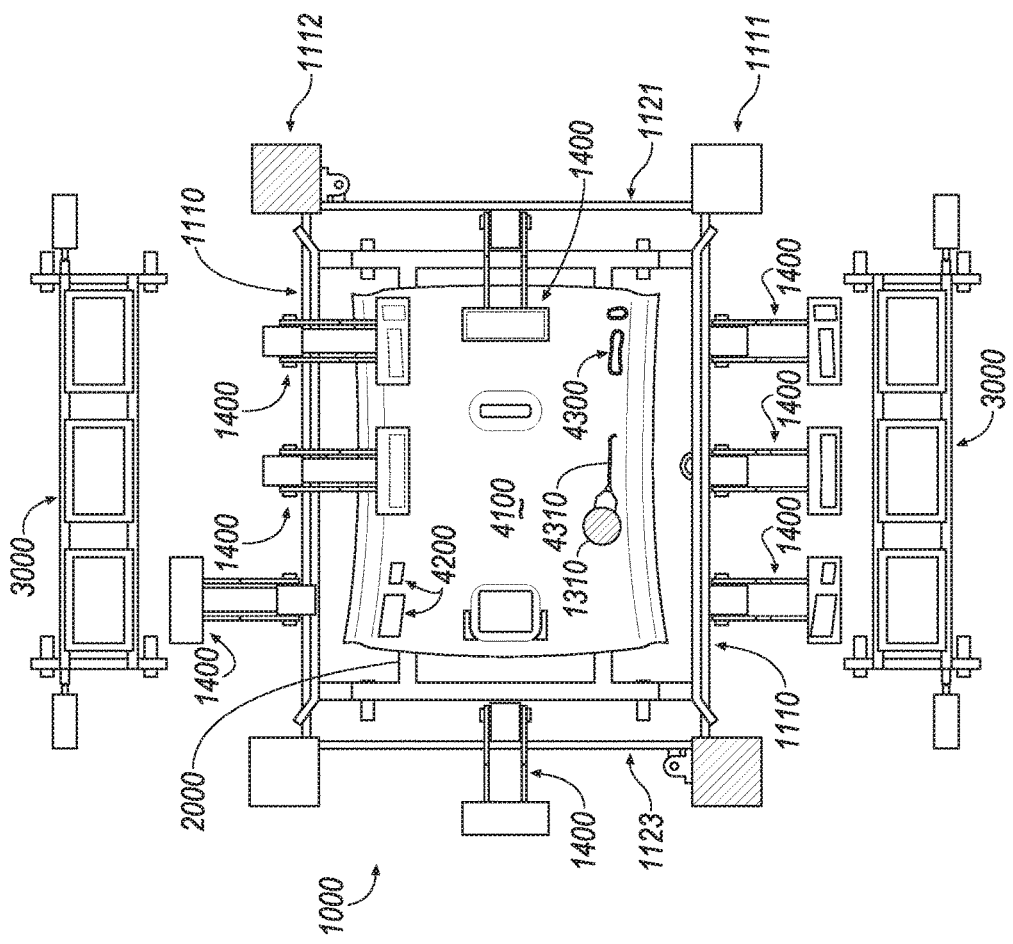
FIG. 7 is a top view of the example apparatus of FIG. 1 showing the apparatus during operation.

Referring to FIG. 7, the process for building a product with a base member 4100 and one or more attaching members 4200 continues with the attachment of the one or more attaching members 4200 to the base member 4100.

As the arm 1310 continues to apply the adhesive 4300 to the base member 4100 along the adhesive pattern 4310, the one or more tooling blocks 1400, which maintain the one or more attaching members 4200, begin to rotate from a disengaged position to an engaged position to apply the one or more attaching members 4200 to base member 4100 at locations where the adhesive 4300 has already been applied along the adhesive pattern 4310. While in the engaged position, the one or more tooling block 1400 maintain a predetermined amount of force upon the one or more attaching members 4200 for a predetermined amount of time in order to ensure that the one or more attaching member 4200 properly adheres to the base member 4100. Once proper attachment of the one or more attaching members 4200 to the base member 4100 has occurred, the one or more tooling blocks 1400 release the one or more attaching members 4200 and return to the disengaged position.

As illustrated in FIG. 7, one or more of the one or more tooling blocks 1400 may attach to either the side wall 1110 at the first side 1111 of the cell 1000, the side wall 1110 at the second side 1112 of the cell 1000, or to both sidewalls 1110.

As further illustrated in FIG. 7, in implementations of the cell 1000 that include one or more end caps 1121, 1123, one or more of the one or more tooling blocks 1400 may attach to each end cap.

The cell 1000 illustrated in FIGS. 1-9 includes eight tooling blocks 1400—three at the side wall 1110 at the first side 1111 of the cell 1000, three at the side wall 1110 at the second side 1112 of the cell 1000, one at the front end cap 1121, and one at the back end cap 1123. The base member 4100 illustrated in FIG. 7 requires the utilization of all eight tooling blocks 1400 to apply the one or more attaching members 4200 to the base member 4100. However, the cell 1000 illustrated in FIGS. 1-9 may also receive and handle base members 4100 having design aspects, such as its shape or its size, that differ from the base member 4100 shown within the cell 1000 in FIG. 7. For other base members 4100, less than all eight of the tooling blocks 1400 may be utilized to apply the one or more attaching members 4200 to the base member 4100. For example, only the six tooling blocks 1400 at the side walls 1110 or only two of the tooling blocks 1400 at each side wall 1110 may be required to apply the one or more attaching members 4200. Any combination of tooling blocks 1400 may be utilized as required by the design of the base member 4100, and non-utilized tooling blocks 1400 may remain in the disengaged position.

Referring to FIG. 8, the process for building a product with a base member 4100 and one or more attaching members 4200 continues with the opening of the end caps 1121, 1123. This occurs after all of the one or more attaching members 4200 have been applied to the base member 4100 and all of the one or more tooling blocks 1400 have returned to a disengaged position. With the one or more attaching members 4200 adhered to the base member 4100, the transporting cart 2000 now supports a finished product 4000. The transporting cart 2000 and the finished product 4000 exit the cell 1000 through the opening at the back end 1116 of the cell 1000.

In some, but not all, implementations, before the cell 1000 opens the end caps 1121, 1123, the vision component 1520 (shown in FIGS. 4 and 6) may compare the finished product 4000 with a stored image of a known finished product 4000 in order to confirm that the one or more attaching members 4200 are satisfactorily adhered to the base member 4100 at the proper location.

Referring to FIG. 9, the process for building a product with a base member 4100 and one or more attaching members 4200 concludes when the transporting cart 2000 and the finished product 4000 have exited the cell 1000. The interior volume 1118 of the cell 1000 is vacant and able to receive another base member 4100 to begin the next cycle.

In alternate implementations of the cell 1000, the finished product 4000 may not exit the cell 1000 with the transporting cart 2000. For example, the cell could be designed with a transporting arm that engages the finished product 4000, lifts the finished product 4000 from the transporting cart 2000, and removes the finished product 4000 from the cell 1000. In these alternate implementations, the transporting cart 2000 may exit the cell 1000 through the opening at the front end 1115 of the cell 1000, receive another base member 4100, and return to the cell 1000 to begin a new cycle.

Figure 10A:
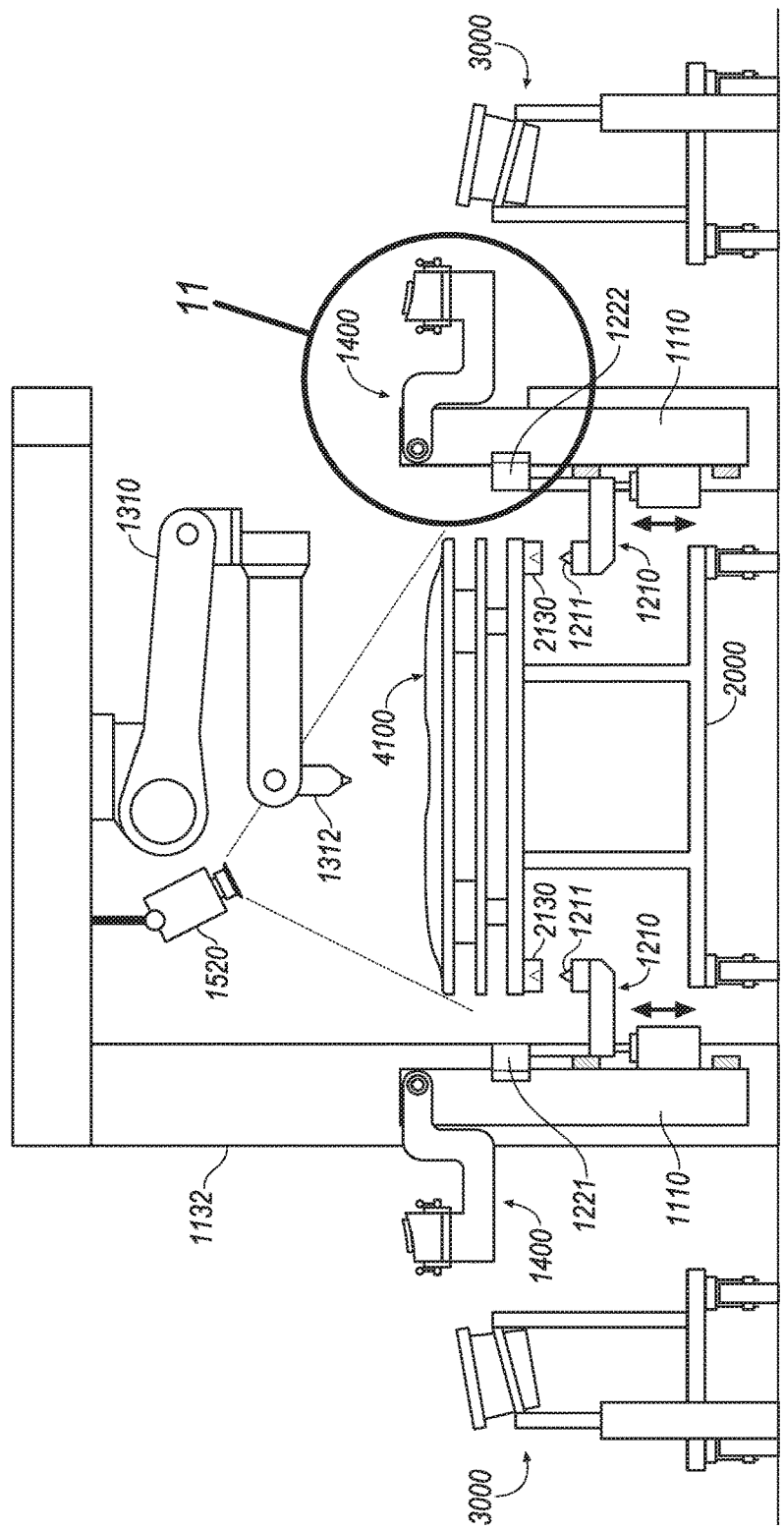
FIGS. 10A-10B are a sectional views of the example apparatus as shown in FIG. 3.

Referring to FIG. 10A, in some implementations, the cell 1000 includes a fine-positioning system to maneuver the base member 4100 to a precise location within the cell 1000 to receive the one or more attaching member 4200. In such implementations, each side wall 1110 of the cell 1000 includes one or more support arms 1210, each of which terminate at a support pin 1211. Once the transporting cart 2000 and the base member 4100 have entered the cell 1000 and the vision component 1520 has confirmed the rough positioning of the transporting cart 2000 and the base member 4100, each support arm 1210 begins to rise to engage the transporting cart 2000.

The cell 1000 may include a datum reference frame that locates the base member 4100 within the cell 1000 before activating the fine-positioning system. The cell 1000 utilizes the location of the base member 4100 to guide the one or more support arms 1210 to engage the base member 4100 for fine-positioning as illustrated in FIG. 10B.

Figure 10B:
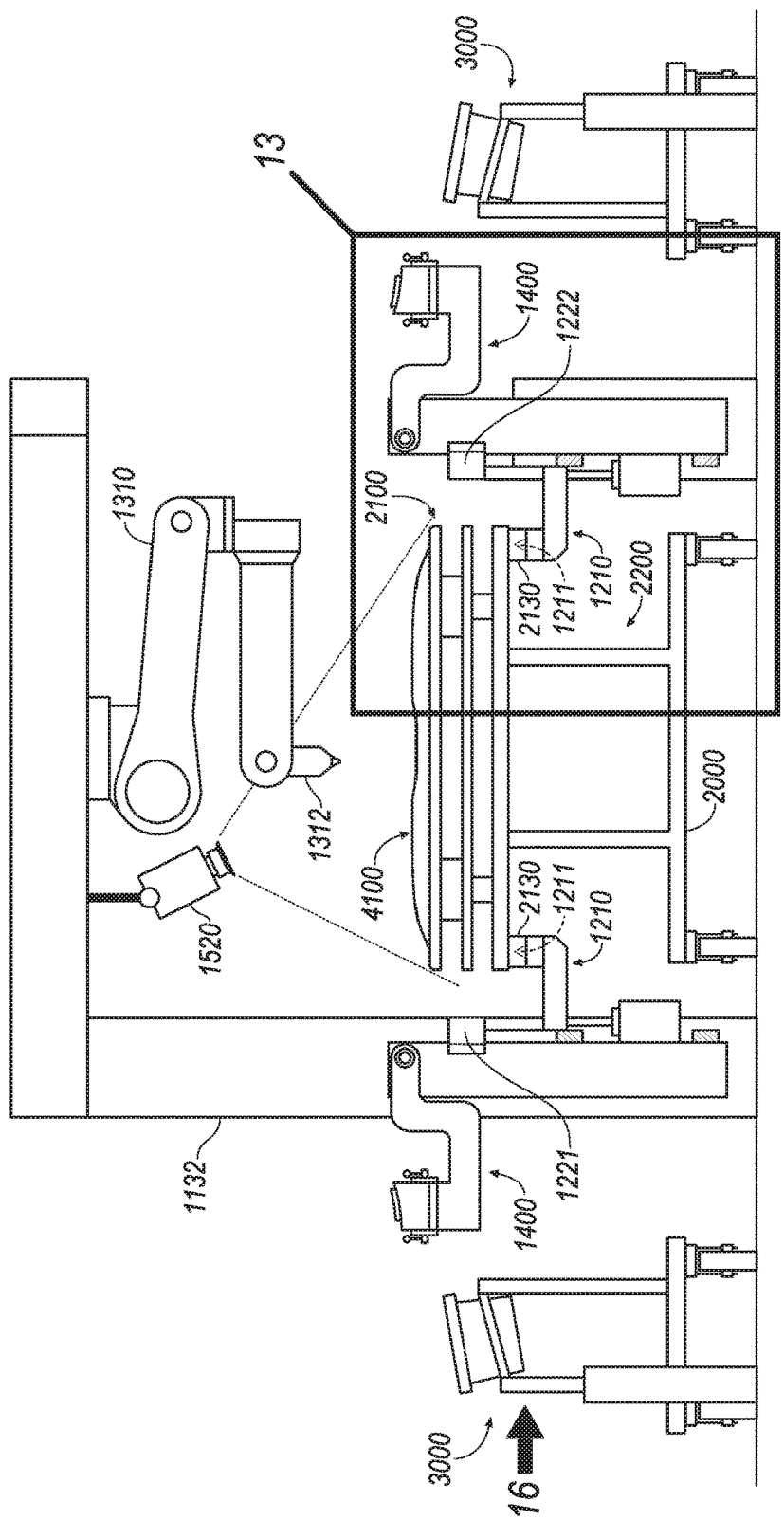

Referring to FIG. 10B, when each support arm 1210 has fully risen to the precise location as directed by the cell 1000, each support pin 1211 engages an associated pin receiver 2130 of the transporting cart 2000. This engagement positions the base member 4100 into an exact position for receiving the one or more attaching members 4200. In some implementations, the support arms 1210 lift the entire transporting cart 2000. In other implementations, the support arms 1210 lift the supporting portion 2100 of the transporting cart 2000, along with the base member 4100, from the structural portion 2200 of the transporting cart 2000.

The fine-positioning system completes the engagement of the pin receiver 2130 of the transporting cart 2000 before the arm 1310 positions the adhesive application member 1312 to apply the adhesive 4300 and before the one or more tooling blocks 1400 rotate from the disengaged position.

As may already be apparent, the invention includes a cell 1000 and a transporting cart 2000. In some embodiments, the invention also includes a product cart 3000. The cell includes an adhesive applicator system 1300, one or more tooling blocks 1400, a control system 1500, and an optional HMI unit 1600.

Referring back to FIG. 1, the adhesive applicator system 1300 of the cell 1000 includes an arm 1310 and a drive motor 1320. The arm 1310 extends from a base portion 1311 to an adhesive application member 1312 that applies an adhesive 4300 to the base member 4100. The arm 1310 is configured to maneuver the adhesive application member 1312 over a full (three-dimensional) range of x, y, and z coordinates throughout which the adhesive 4300 may be applied to various base members 4100 according to various adhesive patterns 4310 (not shown in FIG. 1). In order to accomplish this full range of motion of the adhesive application member 1312, the base portion 1311 of the arm 1310 may attach to upper framing 1140 of the cell 1000 in a fashion that permits (two-dimensional) movement in the x and y directions. Such movement is driven by the drive motor 1320.

In alternate implementations, the arm 1310 may be designed to maneuver the adhesive application member 1312 throughout the full (three-dimensional) range of x, y, and z coordinates required to reach the full extent of each possible adhesive patterns 4310 without the need of a mobile base portion 1311. In such implementations, the base portion 1311 of the arm 1310 attaches to the upper framing 1140 of the cell 1000 at a fixed location.

The upper framing 1140 of the cell 1000, which supports the adhesive applicator system 1300, is shown in FIG. 1 as supported by two structural columns 1132, 1133. These structural columns 1132, 1133 are located at two corners of the cell 1000. Two additional structural columns 1131, 1134 (shown in FIGS. 2-3) are located at the other two corners of the cell 1000, but do not extend vertically (in the z direction) to a sufficient height to support the upper framing 1140 of the cell 1000.

In alternate implementations, any combination of one, two, three, or four of the structural columns 1131, 1132, 1133, 1134 extend vertically (in the z direction) to a sufficient height to support the upper framing 1140 of the cell 1000. In other alternate implementations, the support system for the upper framing 1140 of the cell 1000 does not include any of the structural columns 1131, 1132, 1133, 1134. For example, the upper framing 1140 of the cell 1000 may be supported by the roof, ceiling, or cover of the building or structure that houses the cell 1000, the upper framing 1140 of the cell 1000 may be supported by an alternate support system associated with the cell 1000, or the upper framing 1140 of the cell 1000 may be supported by an independent, suspended support system.

The design of the upper framing 1140 of the cell 1000, as shown in FIG. 1, allows for the attachment and support of the adhesive applicator system 1300. The particularities of the design of the upper framing 1140 of the cell 1000 may vary from the particular implementation illustrated in FIG. 1. In alternate implementations, the adhesive applicator system 1300 may be otherwise attached to and supported by the upper framing 1140 of the cell 100, the adhesive applicator system 1300 may be attached to and supported by an independent, suspended support that is not part of the cell 1000, or the adhesive applicator system 1300 may be supported in any other fashion that permits the adhesive applicator system 1300 to operate according to the intended design of the cell 1000.

The arm 1310 manipulates the adhesive application member 1312 along the (three-dimensional) pattern of x, y, and z coordinates corresponding to the specific base member 4100 being handled by the cell 1000. Accordingly, as base members 4100 of different designs enter the cell 1000, the arm manipulates the adhesive application member 1312 along different patterns to apply the adhesive 4300 in a particularized manner for each different base member 4100 which may be handled by the cell 1000.

Figure 11A:
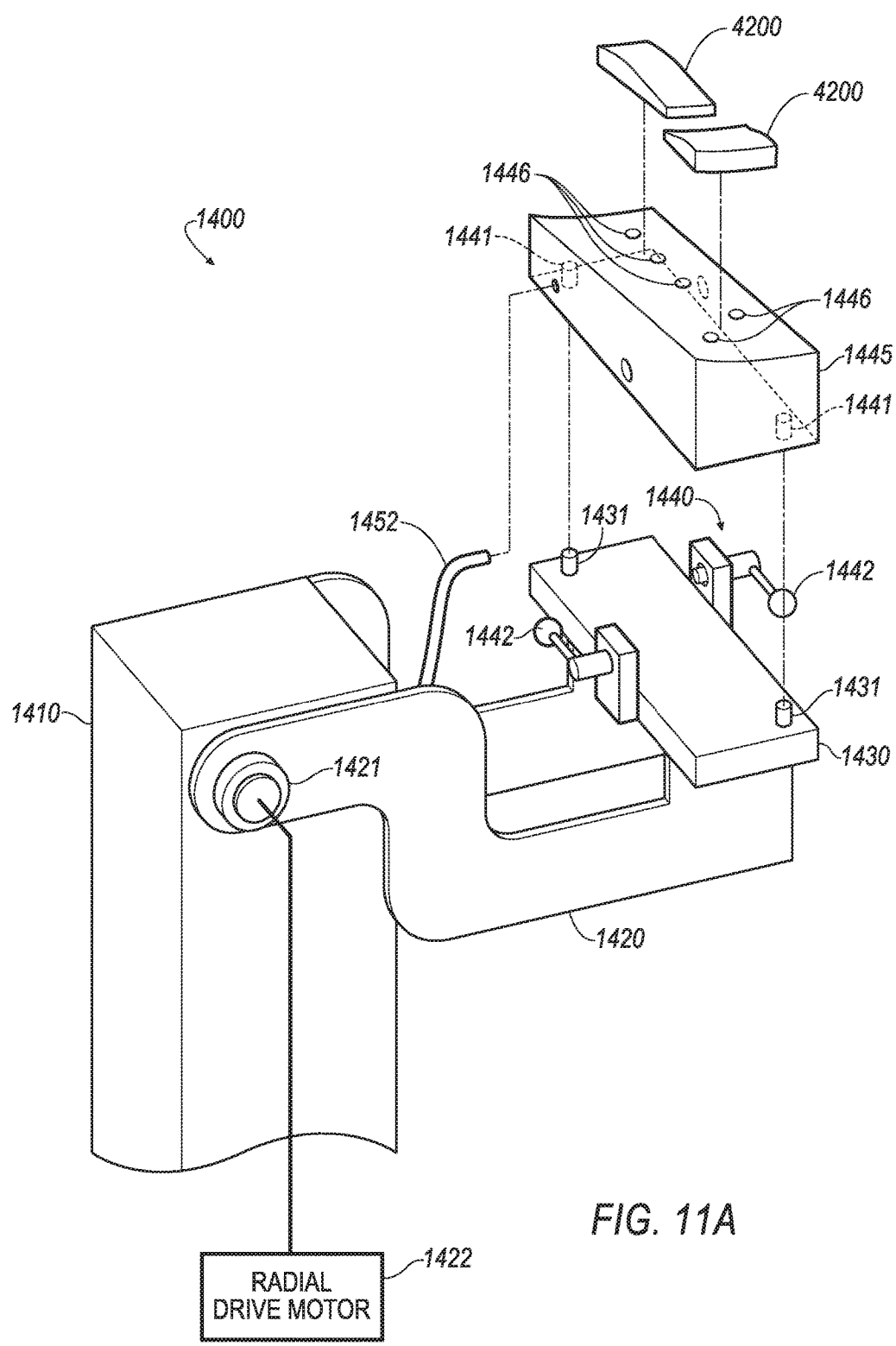
FIG. 11A is an exploded perspective view of a tooling block associated with the example apparatus of FIG. 1.
Figure 11B:
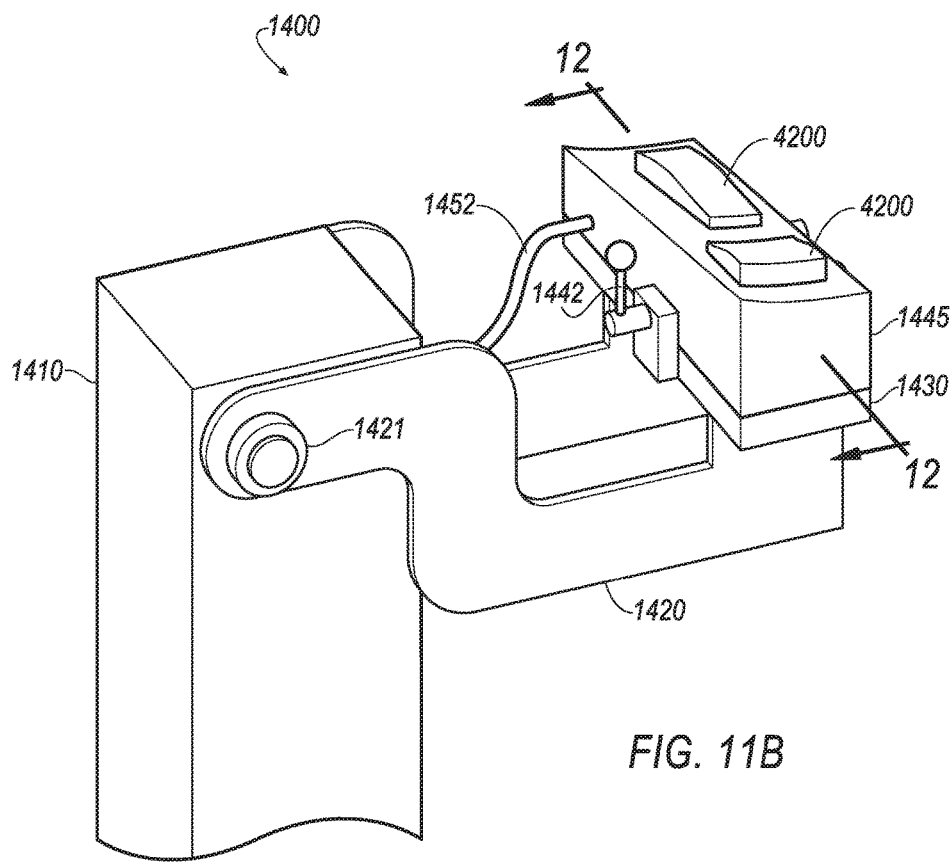
FIG. 11B is a perspective view of the tooling block of FIG. 11A.

Referring to FIGS. 11A and 11B, the tooling block 1400 includes a rotating arm 1420, a flipping plate 1430, a quick-disconnect system 1440, and an adjustable base 1410. One end of the rotating arm 1420 attaches to the adjustable base 1410 with a connection 1421 enabling rotation of the rotating arm 1420. A rotary drive motor 1422 rotates the rotating arm 1420 around its connection 1421. The rotating arm may also include a radial position sensor 1425 (not shown in FIGS. 11A and 11B), which determines the radial position—from a disengaged position to an engaged position—of the rotating arm 1420 and may communicate this position to a control system 1500 (not shown in FIGS. 11A and 11B).

At the end opposing the connection 1421 to the adjustable base 1410, the rotating arm 1420 terminates at a flipping plate 1430. The flipping plate 1430, which includes one or more keyed components 1431, is designed to receive a quick-disconnect tooling 1445.

The flipping plate 1430 is associated with a quick-disconnect system 1440. The quick-disconnect system 1440 includes one or more quick-disconnect levers 1442, the quick-disconnect tooling 1445, and one or more keyed components 1441 associated with the quick-disconnect tooling 1445.

The keyed component 1431 of the flipping plate 1430 engages the keyed component 1441 of the quick-disconnect system 1440 to facilitate the connection of the quick-disconnect tooling 1445 to the flipping plate 1430. The keyed components 1431, 1441 may incorporate any design which enables their engagement and facilitates the flipping plate 1430 receiving the quick-disconnect tooling 1445. For example, as illustrated in FIG. 11A, the keyed component 1431 of the flipping plate 1430 may be implemented as a protrusion, such as a peg, and the keyed component 1441 of the quick-disconnect system 1440 may be implemented as a depression, such as a peg-receiving hole. The keyed components 1431, 1441 may also be implemented as a protrusion from the quick-disconnect tooling 1445 and a depression into the flipping plate 1430, as a system of ridges, as a hook and loop fastener, or as any other mechanism that facilitates the flipping plate 1430 receiving the quick-disconnect tooling 1445. Additionally, the tooling block 1440 may be designed without either keyed component 1431, 1441 and may rely on the other components of the quick-disconnect system 1440 to facilitate the connection of the quick-disconnect tooling 1445 to the flipping plate 1430.

The one or more quick-disconnect levers 1442 may attach to the flipping plate 1430. Once the flipping plate 1430 has received the quick-disconnect tooling 1445, the one or more quick-disconnect levers 1442 may be rotated from a disengaged position, as shown specifically in FIG. 11A, to an engaged position, as shown specifically in FIG. 11B, to apply pressure to the quick-disconnect tooling 1445 to maintain the positioning of the quick-disconnect tooling 1445 on the flipping plate 1430.

After being secured onto the flipping plate 1430, the quick-disconnect tooling 1445 receives one or more attaching members 4200. The design of the quick-disconnect tooling 1445 incorporates a shape that allows the one or more attaching members 4200 to easily fit onto the surface of the quick-disconnect tooling 1445. The design of the quick-disconnect tooling 1445 also may incorporate one or more vacuum ports 1446 strategically located within the quick-disconnect tooling 1445 to maintain the positioning of the one or more attaching members 4200 on the surface of the quick-disconnect tooling 1445. As shown specifically in FIG. 11B, when the quick-disconnect tooling 1445 is in place on the flipping plate 1430, the one or more vacuum ports 1446 are in fluid communication with a vacuum manifold 1452.

Figure 12:
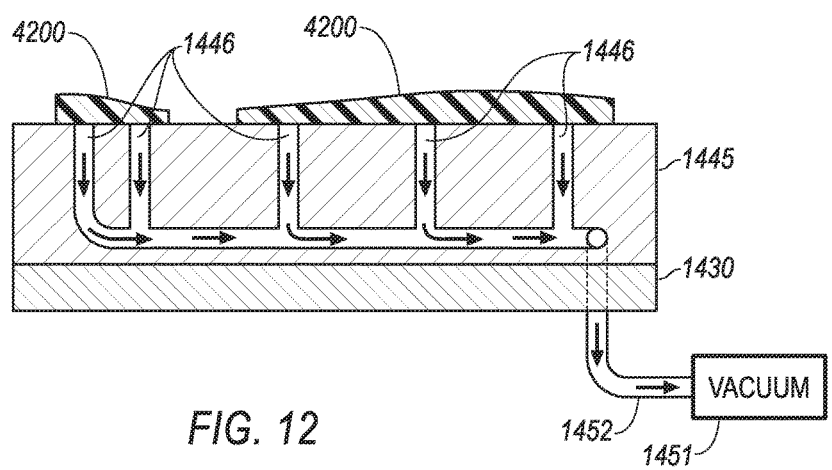
FIG. 12 is a sectional view of the tooling block of FIG. 11B.

Referring to FIG. 12, the tooling block 1400 may also include a vacuum system to maintain the one or more attaching members 4200 on the surface of the quick-disconnect tooling 1445. A vacuum pump 1451 is in fluid communication with the one or more vacuum ports 1446 in the quick-disconnect tooling 1445 through the vacuum manifold 1452. When activated, the vacuum pump 1451 maintains the one or more attaching members 4200 on the surface of the quick-disconnect tooling 1445 by creating a negative, or suction, pressure within the vacuum ports 1446.

Figure 13A:
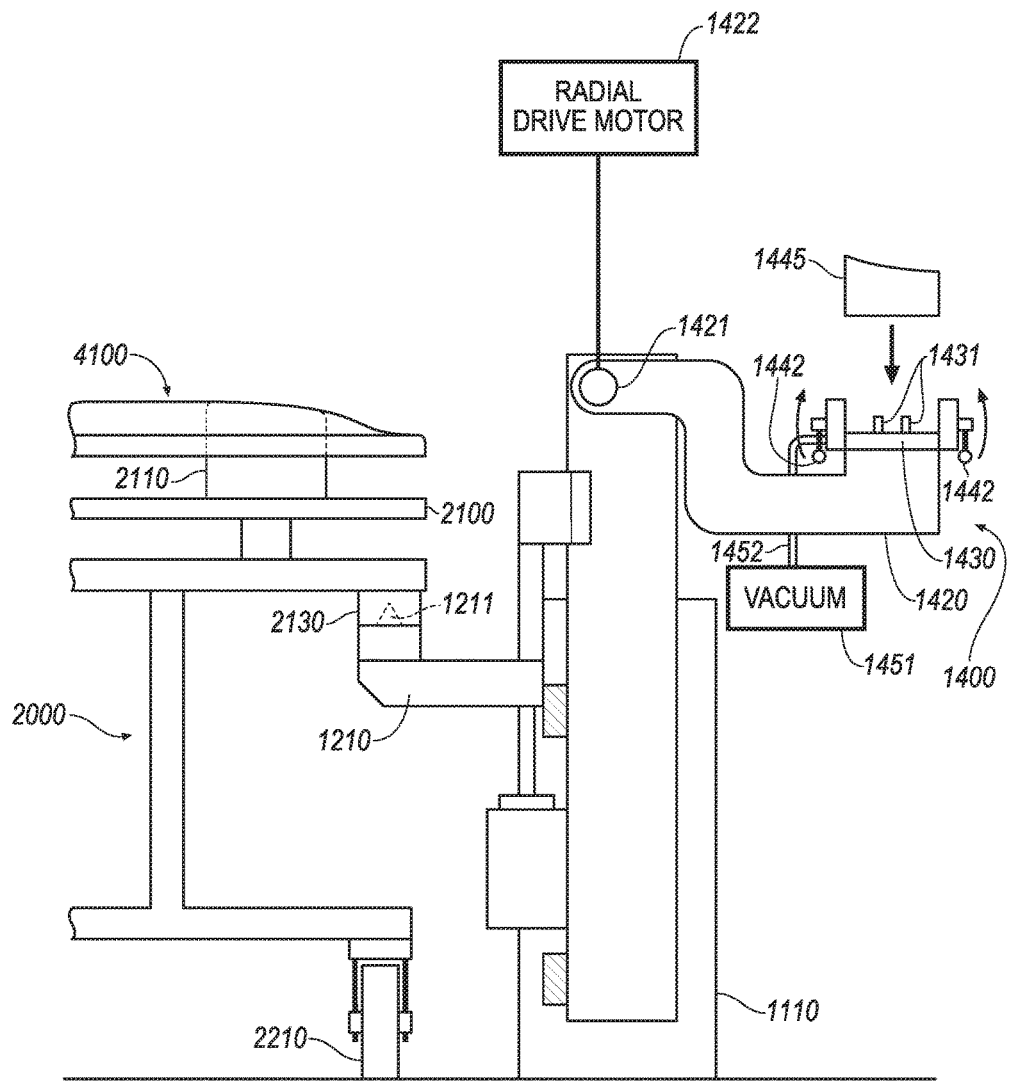
FIGS. 13A-13D are side views of a portion of the example apparatus of FIG. 1 showing the tooling block before, during, and after operation of the apparatus.

Referring to FIG. 13A, the functioning of the tooling block 1400 begins when the quick-disconnect tooling 1445 is placed upon the flipping plate 1430. The keyed component 1431 of the flipping plate 1430 initially engages the quick-disconnect tooling 1445, and the one or more quick-disconnect levers 1442 moves to an engaged position to secure the quick-disconnect tooling 1445.

Figure 13B:
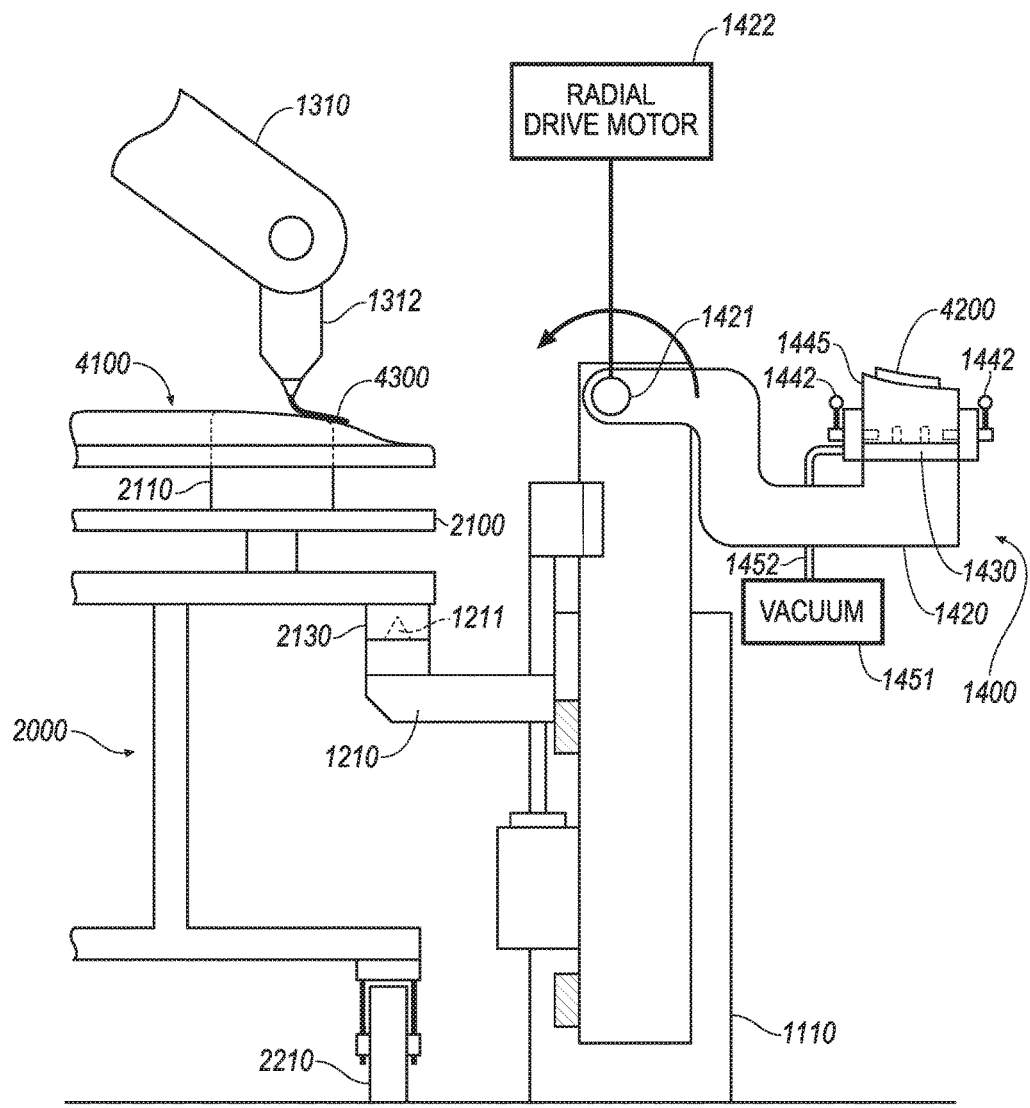

Referring to FIG. 13B, the functioning of the tooling block 1400 continues when the quick-disconnect tooling 1445 receives the one or more attaching member 4200. The vacuum pump 1451, through the vacuum manifold 1452, maintains the one or more attaching members 4200 on the surface of the quick-disconnect tooling 1445 by creating a suction pressure.

After the support arms 1210, with the support pins 1211, have engaged the pin receivers 2130 of the transporting cart 2000 and the adhesive application member 1312 of the arm 1310 has finished applying the adhesive 4300 along the adhesive pattern 4310 associated with the one or more attaching members 4200 maintained on the surface of the quick-disconnect tooling 1445, the rotary drive motor 1422 initiates the rotation of the rotating arm 1420 from its disengaged position.

Figure 13C:
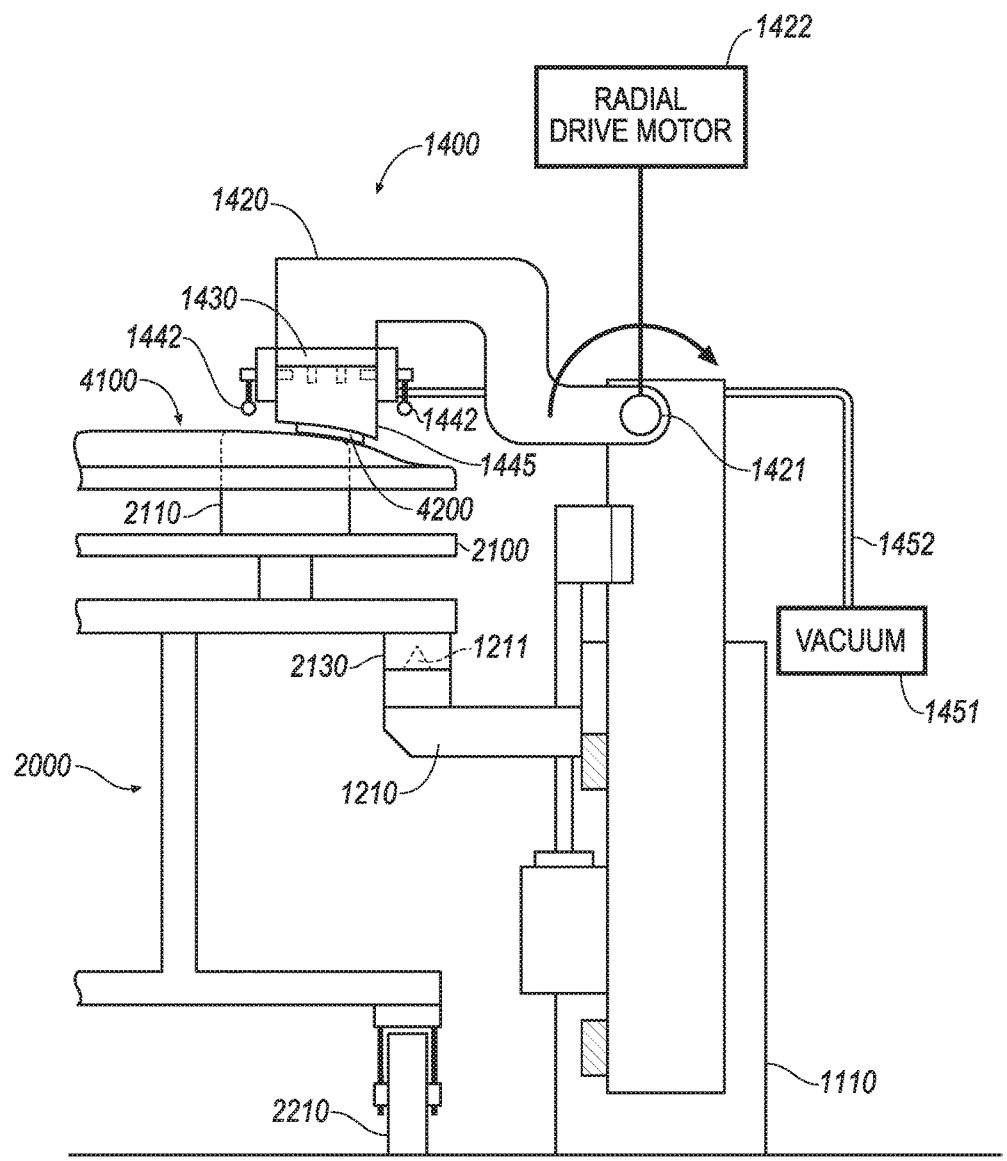

Referring to FIG. 13C, the functioning of the tooling block 1400 continues when the rotary drive motor 1422 rotates the rotating arm 1420 to its engaged position. In this position, the tooling block 1400 applies the one or more attaching members 4200 to the base member 4100 along the associated adhesive pattern 4310. The rotary drive motor 1422 continues to direct the tooling block 1400 to apply force onto the one or more attaching members 4200 for a preset amount of time. During this preset amount of time during which the force is applied to the one or more attaching members 4200, the tooling block 1400 remains in its engaged position.

While the tooling block 1400 remains in the engaged position, the vacuum pump 1451 deactivates, relieving the suction pressure holding the one or more attaching members 4200 to the surface of the quick-disconnect tooling 1445.

Once the preset time for applying the force to the one or more attaching members 4200 has elapsed, the rotary drive motor 1422 rotates the tooling block 1400 back to the disengaged position.

Figure 13D:
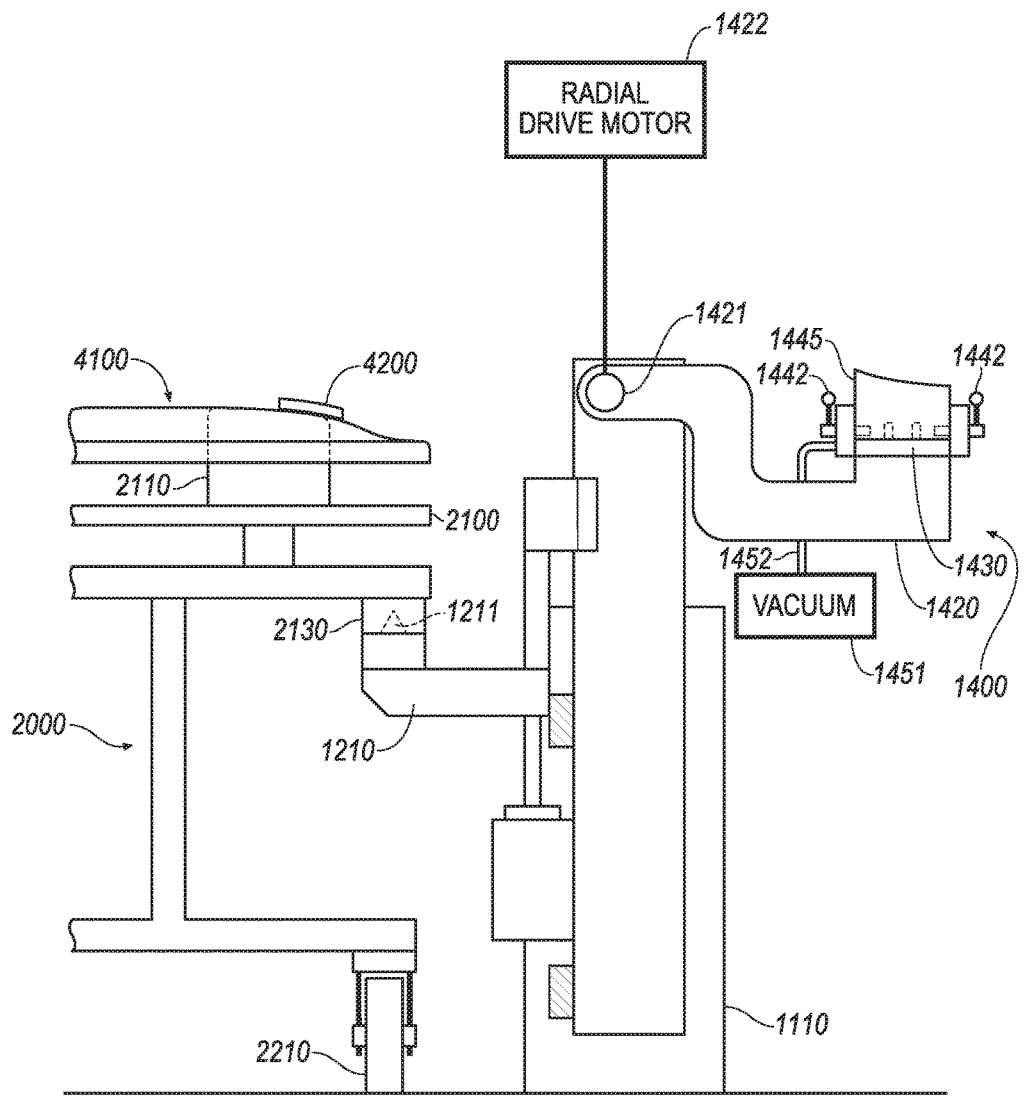

Referring the FIG. 13D, at the conclusion of the functioning of the tooling block 1400, the tooling block 1400 has returned to its disengaged position, but the one or more attaching members 4200 remain attached to the base member 4100.

Each tooling block 1400 of the cell 1000 may utilize a servo electric motor as its rotary drive motor 1422. However, any electric drive mechanism capable of rotating the rotating arm 1420 from the disengaged to the engaged position and applying constant force upon the one or more attaching members 4200 while the tooling block 1400 is in the engaged position may serve as the rotary drive motor 1422. Alternatively, the tooling block 1400 may utilize a pneumatic or manual mechanism as its rotary drive motor 1422.

The rotational length of the rotating arm 1420 between the disengaged position and the engaged position may vary depending on the design of the base members 4100 being handled by the cell 1000, with rotational lengths varying from less than 120 degrees to more than 210 degrees. The design of the tooling block 1400, including the rotary drive motor 1422, allows for the rotational length to vary depending on the base member 4100 to which the one or more attaching members 4200 are applied.

Figure 14:
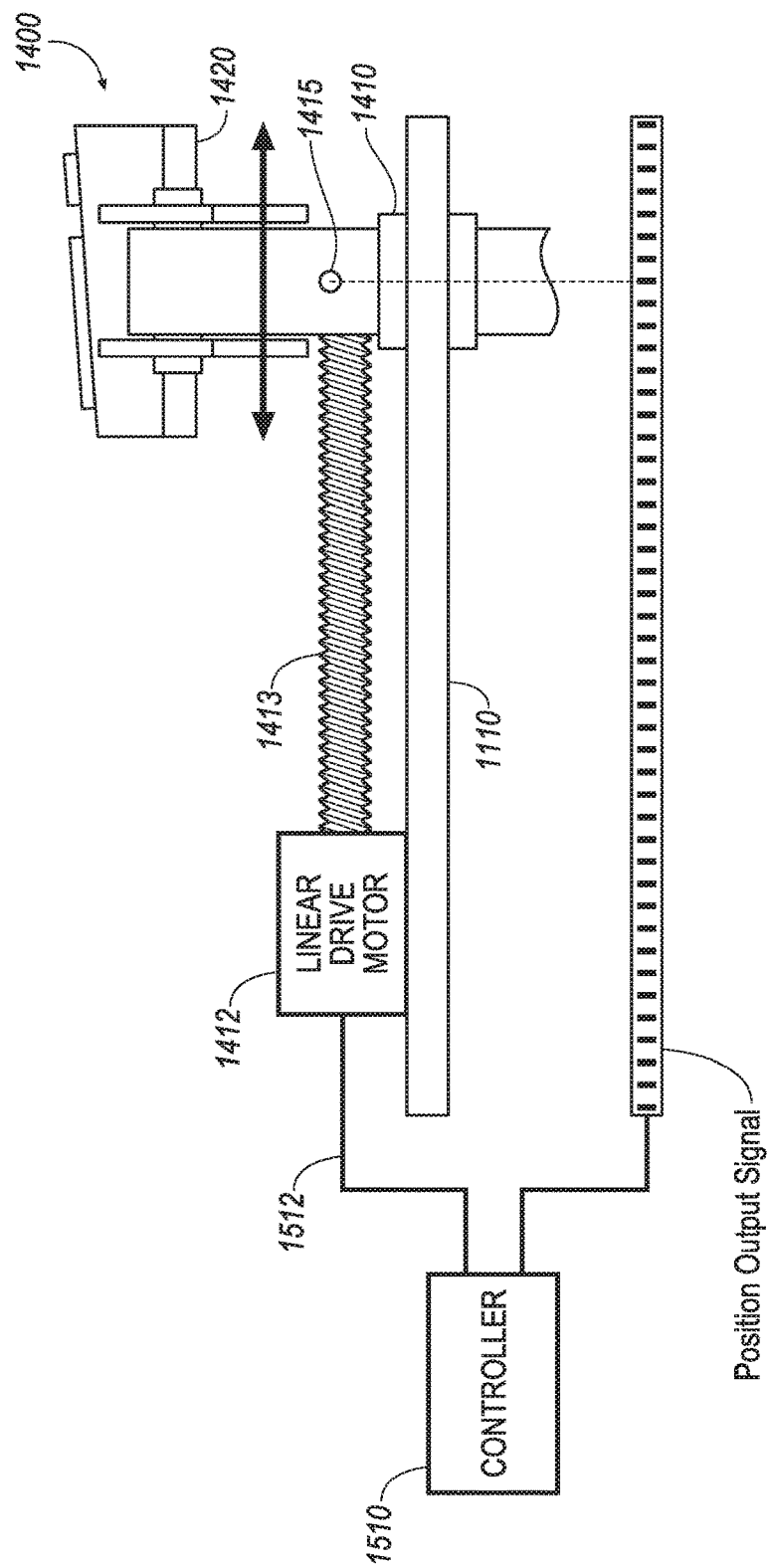
FIG. 14 is an exaggerated top view illustrating the linear drive system associated with a tooling block.

Referring to FIG. 14, the adjustable base 1410 of the tooling block 1400 slidably attaches to one of the side walls 1110 of the cell 1000 or to one of the end caps 1121, 1123 of the cell 1000. The linear drive motor 1412 extends or contracts an extension rod 1413 to slide the adjustable base 1410 in either direction along the side wall 1110 of the cell 1000. All components of the tooling block 1400, including the rotating arm 1420 of the tooling block 1400 which is attached to the adjustable base 1410, move laterally as the linear drive motor 1412 slides the adjustable base 1410 along the side wall 1110.

Each tooling block 1400 of the cell 1000 may utilize a servo electric motor as its linear drive motor 1412. However, any electric drive mechanism capable of extending and contracting an extension rod 1413 or otherwise sliding the adjustable base 1410 along the side wall 1110 may serve as the linear drive motor 1412. Alternatively, the tooling block 1400 may utilize a pneumatic or manual mechanism as its linear drive motor 1412. For example, the adjustable base 1410 may only be capable of moving when an operator removes a lock pin 1411 (not shown in FIG. 14), slides the adjustable base 1410 to a new location on the side wall 1110, and reinserts the lock pin 1411.

The stroke length along which the adjustable base 1410 may slide is physically limited by the length of the side wall 1110 and the quantity of tooling blocks 1400 attached to the side wall 1110. The tooling block 1400 may be capable of functioning at any incremental position along the stroke length or the tooling block 1400 may have designated linear positions from which it is capable of functioning. As one example, the tooling block 1400 may utilize three adjustable positions along a five-inch stroke length, with a standard position, a second position at negative two inches, and a third position at positive three inches.

Whether the positions of the tooling block 1400 are designated or the tooling block 1400 can function at any incremental position, the tooling block 1400 may include a linear position sensor 1415 that determines the linear position of the tooling block 1400 along the stroke length of the adjustable base 1410 and may communicate this position to a controller 1510.

The implementation shown in FIG. 14 includes a linear drive motor 1412 activated by a control signal 1512 from a controller 1510. The control signal 1512 is illustrated as being communicated through a hard communication line to the linear drive motor 1412. In alternate implementations, the control signal 1512 may be communicated utilizing a wireless communication signal, such as a radio signal.

Figure 15:
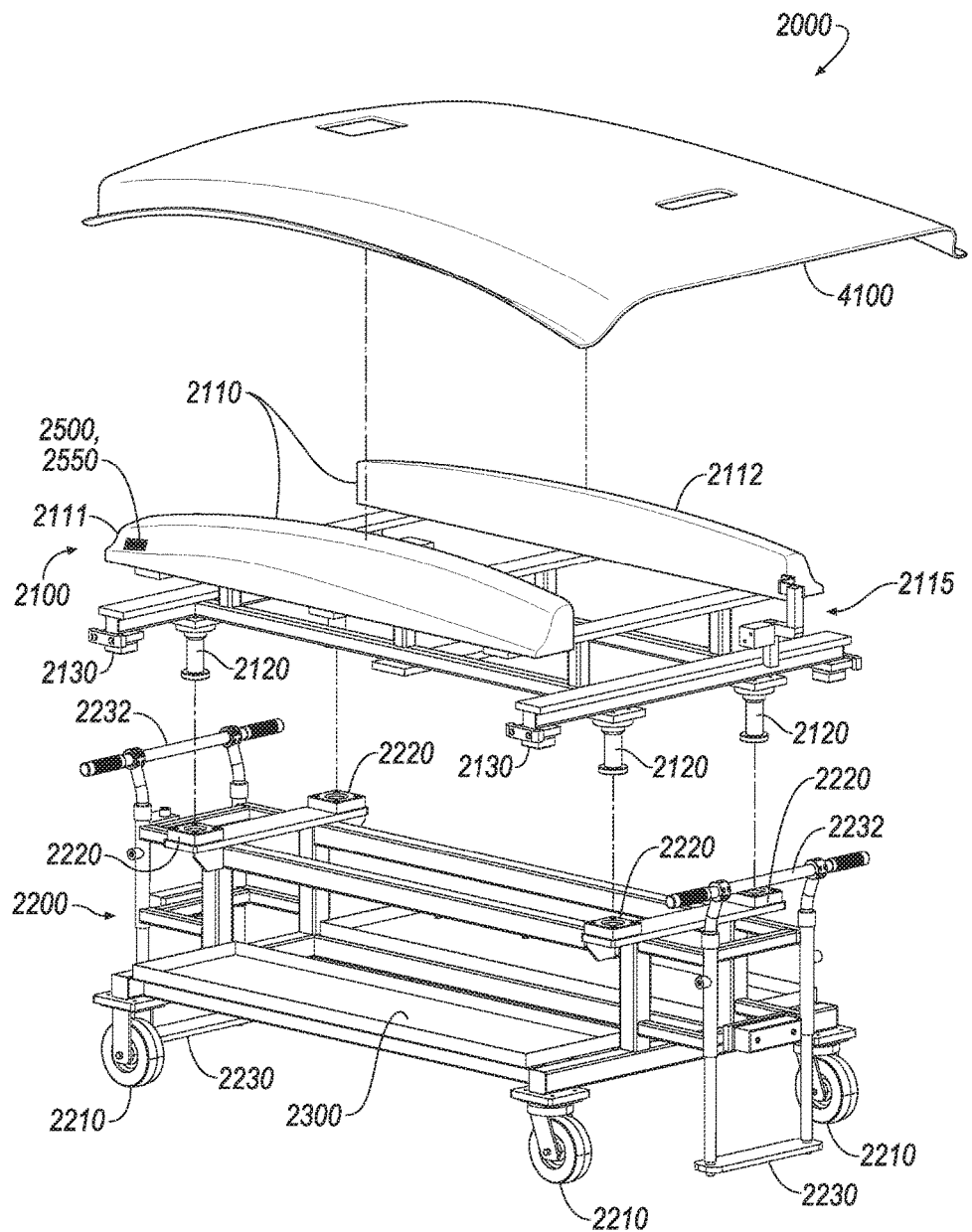
FIG. 15 is an exploded perspective view of an example transporting cart.

Referring to FIG. 15, the transporting cart 2000 transports the base member 4100 into and out of the cell 1000 (not shown).

The transporting cart 2000 may include a supporting portion 2100, a structural portion 2200, one or more transporting tray 2300, and a cart identifier 2500. The supporting portion 2100 of the transporting cart 2000 may include a product-supporting device 2110, one or more cart engagement member 2120, and one or more pin receiver 2130. The product-supporting device 2110 supports the base member 4100 and maintains the position of the base member 4100 on the transporting cart 2000. As illustrated, the product-supporting device 2110 may include a first product-supporting member 2111 and a second product-supporting member 2112. Each different base member 4100 design corresponds to a unique product-supporting device 2110.

The product-supporting device 2110 may attach to framing 2115 of the supporting portion 2100 of the cart 2000. This framing 2115 may incorporate the one or more cart engagement member 2120 and the one or more pin receivers 2130.

The structural portion 2200 of the transporting cart 2000 may include one or more wheels 2210, one or more supporting-portion engagement mechanisms 2220, one or more positioning member 2230, and one or more handle 2232. The one or more wheels 2210 provide mobility for the transporting cart 2000 and may be replaced, in alternate implementations, by any other mechanism allowing for mobility of the transporting cart 2000.

The one or more supporting-portion engagement mechanisms 2220 of the structural portion 2200 of the transporting cart 2000 may incorporate any design which enables the structural portion 2200 of the transporting cart 2000 to receive the supporting portion 2100 of the transporting cart 2000. For example, the one or more supporting-portion engagement mechanisms 2220 may be implemented as one or more depressions, such as peg-receiving holes, for engaging the one or more cart engagement members 2120, which may be implemented as one or more protrusions, such as pegs. Alternatively, the one or more supporting-portion engagement mechanisms 2220 may also be implemented as one or more protrusions with the one or more cart engagement members 2120 implemented as one or more depressions into the framing 2115 of the supporting portion 2100 of the transporting cart 2000.

The engagement of the one or more supporting-portion engagement mechanisms 2220 and the one or more cart engagement members 2120 maintains the positioning of the supporting portion 2100 of the transporting cart 2000 relative to the structural portion 2200 of the transporting cart 2000. However, this design also permits the supporting portion 2100 of the transporting cart 2000 to be lifted off of the structural portion 2200 of the transporting cart 2000 when the one or more support arms 1210 and support pins 1211 of the cell 1000 (shown in FIGS. 10A and 10B) engage the one or more pin receivers 2130 of the transporting cart 2000.

In alternative implementations, the transporting cart 2000 may not include the one or more supporting-portion engagement mechanisms 2220 or the one or more cart engagement members 2120. In these implementations, the supporting portion 2100 of the transporting cart 2000 is permanently attached to the structural portion 2200 of the transporting cart 2000. When the one or more support arms 1210 and support pins 1211 of the cell 1000 (shown in FIGS. 10A and 10B) engage the one or more pin receivers 2130 of the transporting cart 2000, either the entire transporting cart 2000 is lifted or, as shown in FIGS. 10A and 10B, the one or more support arms 1210 precisely position the transporting cart 2000 and the base member 4100 within the cell 1000 without lifting the transporting cart 2000 or the base member 4100.

The one or more positioning member 2230 of the transporting cart 2000 functions as a stopper to roughly located the transporting cart 2000 in the correct position within the cell 1000 by engaging the hard stop 1230 (shown in FIG. 2). The positioning member 2230 may be raised to allow the transporting cart 2000 to travel over the hard stop 1230.

The one or more handle 2232 of the transporting cart 2000 allows the cart to be maneuvered into and out of the cell 1000 by an operator. The one or more handle 2232 may also function to raise or lower the one or more positioning member 2230. In alternate implementations, the transporting cart 2000 may be motorized and does not include the one or more handle 2232.

The one or more transporting trays 2300 of the transporting cart 2000 may attach to the structural portion 2200 of the transporting cart 2000. The one or more transporting trays 2300 transports items or components associated with the operation of the cell 1000. For example, if the transporting cart 2000 transports a base member 4100 requiring a change of the quick-disconnect tooling 1445, then the one or more transporting trays 2300 may transport the quick-disconnect tooling 1445 associated with the transported base member 4100 into the cell 1000.

All components associated with the transporting cart 2000, except for the supporting portion 2100, are universal, with the ability to transport base members 4100 of any design. The design of the transporting cart 2000 enables the transporting cart 2000 to support base members 4100 of varying shapes, sizes, and designs and to transport the varying base members 4100 into the cell 1000.

The cart identifier 2500 may include a barcode 2550 and a barcode scanner (not shown) that remains within the cell 1000, which is capable of reading the barcode 2550 to identify the base member 4100 that transporting cart 2000 has transporting into the cell 1000. In alternate implementations, an operator manually operates the barcode scanner to identify the transporting cart 2000 being handled by the cell 1000. In other alternate implementations, the cart identifier 2500 may include an identifier other than a barcode 2550 and barcode scanner, such as a series of binary switches and switch activating pegs.

The barcode 2550 is associated with the supporting portion 2100 of the transporting cart 2000, which is the only portion of the transporting cart 2000 that is unique to the particular base member 4100 transported by the transporting cart 2000.

After the cell 1000 has handled all of the desired base members 4100 of a particular design, the supporting portion 2100 of the transporting cart 2000 is removed from the structural portion 2200 of the transporting cart 2000. A new supporting portion 2100, which corresponds to the design of the next base members 4100 to be handled by the cell 1000, is inserted on top of the structural portion 2200 of the transporting cart 2000. The new supporting portion 2100 includes a new barcode 2550, which alerts the cell 1000 that a base member 4100 with a design differing from the prior base member 4100 has entered the cell 1000. Additionally, the transporting cart 2000 carries the quick-disconnect tooling 1445 corresponding to the design of the new base member 4100 into the cell 1000 on the transporting tray 2300. An operator disconnects the quick-disconnect tooling 1445 corresponding to the prior base member 4100 and replaces it with the quick-disconnect tooling 1445 corresponding to the new base member 4100.

Figure 16:
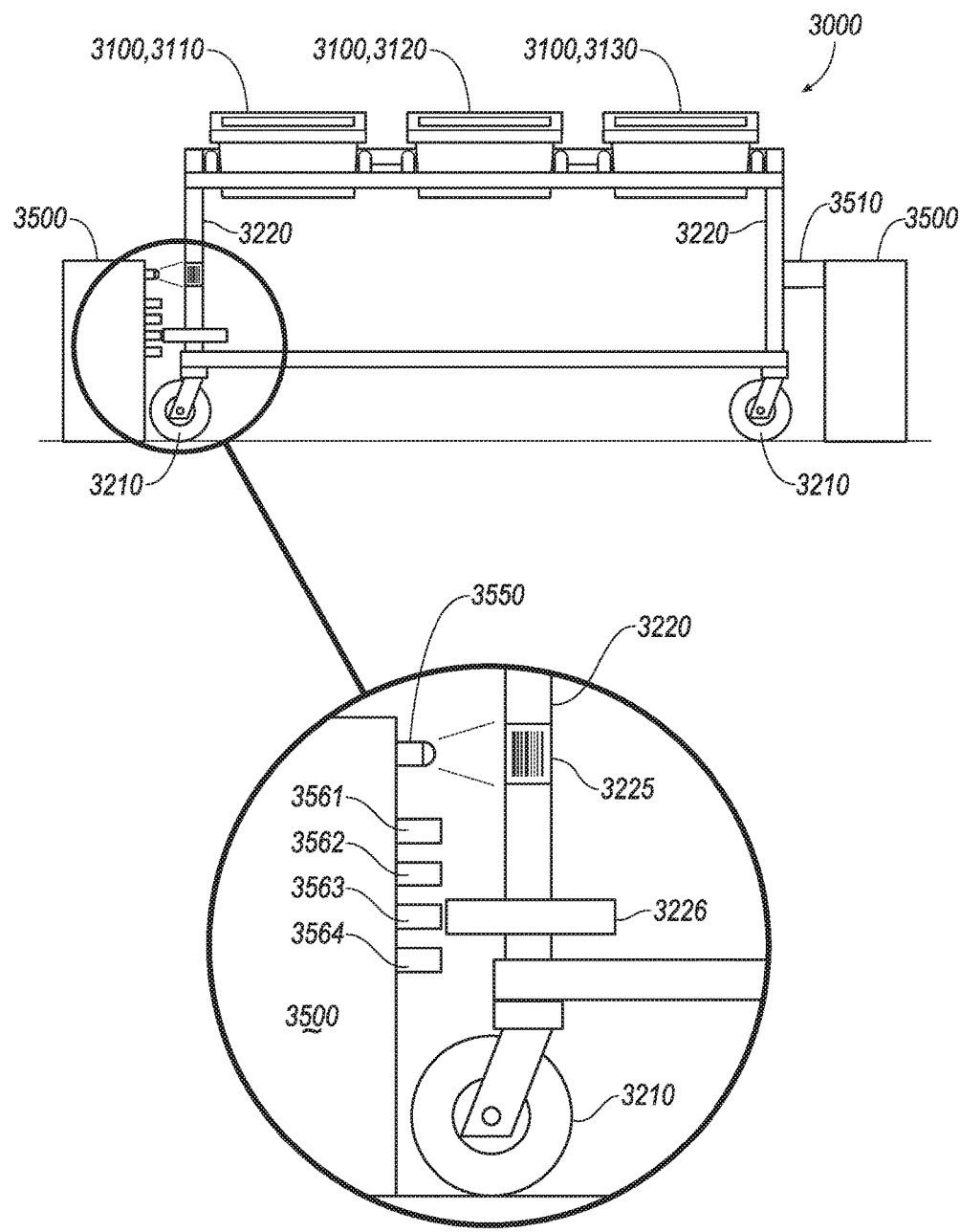
FIG. 16 is a side view of an example product cart.

Referring to FIG. 16, the product cart 3000 retains the one or more attaching member 4200 (not shown).

The product cart 3000 may include one or more attaching member receptacles 3100 and a structural portion 3200. The product cart 3000 may also associate with a retaining structure 3500.

In the implementation of FIGS. 2-16, two product carts 3000, one at the first side 1111 of the cell 1000 and one at the second side 1112 of the cell 1000, retain the one or more attaching members 4200 utilized during the process for building a product with a base member 4100 and one or more attaching members 4200. Each of the two product carts 3000 retain the one or more attaching members 4200 with three attaching member receptacles 3100: a first receptacle 3110, a second receptacle 3120, and a third receptacle 3130. The quantity of product carts 3000 associated with a cell 1000 may vary from zero to more than two. The quantity of attaching member receptacles 3100 on each product cart 3000 may vary from one to more than three. Although it may be advantageous to associate one attaching member receptacle 3100 for each tooling block 1400 attached to the cell 1000, this is not a requirement that affects the operation of the cell 1000.

Returning specifically to FIG. 16, structural portion 3200 of the product cart 3000 may include one or more wheels 3210 and one or more legs 3220. The one or more wheels 3210 provide mobility for the product cart 3000 and may be replaced, in alternate implementations, by any other mechanism allowing for mobility of the product cart 3000.

The one or more legs 3220 act as structural members for the product cart 3000 and include an identification means that may include a barcode 3225, a set of identification pegs 3226, any other device that identifies the product cart 3000, or a combination thereof. The set of identification pegs 3226 include zero or more identification pegs that corresponds to a set binary switches 3560.

The retaining structure 3500 may include a member at both sides of the product cart 3000 to assure that the identification means can be read and that the product cart 3000 remains in place during operation of the cell 1000. At the end of the product cart 3000 that does not include the identification means, the retaining structure 3500 may include only a positioning member 3510. At the other end of the product cart 3000, the retaining structure 3500 may also include an identifier, such as at least one of a barcode scanner 3550 or a set of binary switches 3560. The barcode scanner 3550 reads the barcode 3225 on the leg 3220 of the product cart 3000. The set of binary switches 3560 is illustrated in FIG. 16 as including a first binary switch 3561, a second binary switch 3562, a third binary switch 3563, and a fourth binary switch 3564. Each binary switch may be activated by an identification peg 3226 on the leg 3220 of the product cart 3000. The implementation of FIG. 16 illustrates a product cart 3000 identified by a single identification peg that depresses only the third binary switch 3563.

Figure 17:
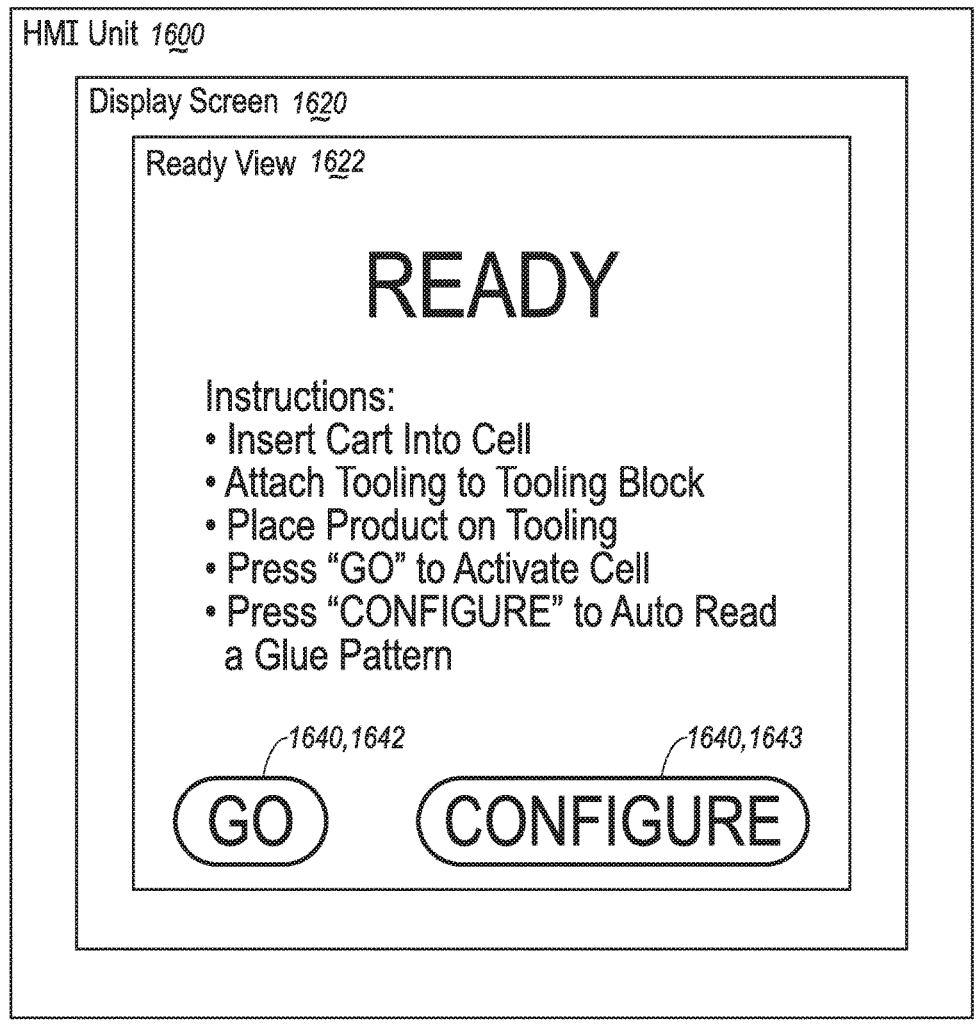
FIGS. 17-19 are schematic views of views displayed on the screen of an example HMI unit.
Figure 18:
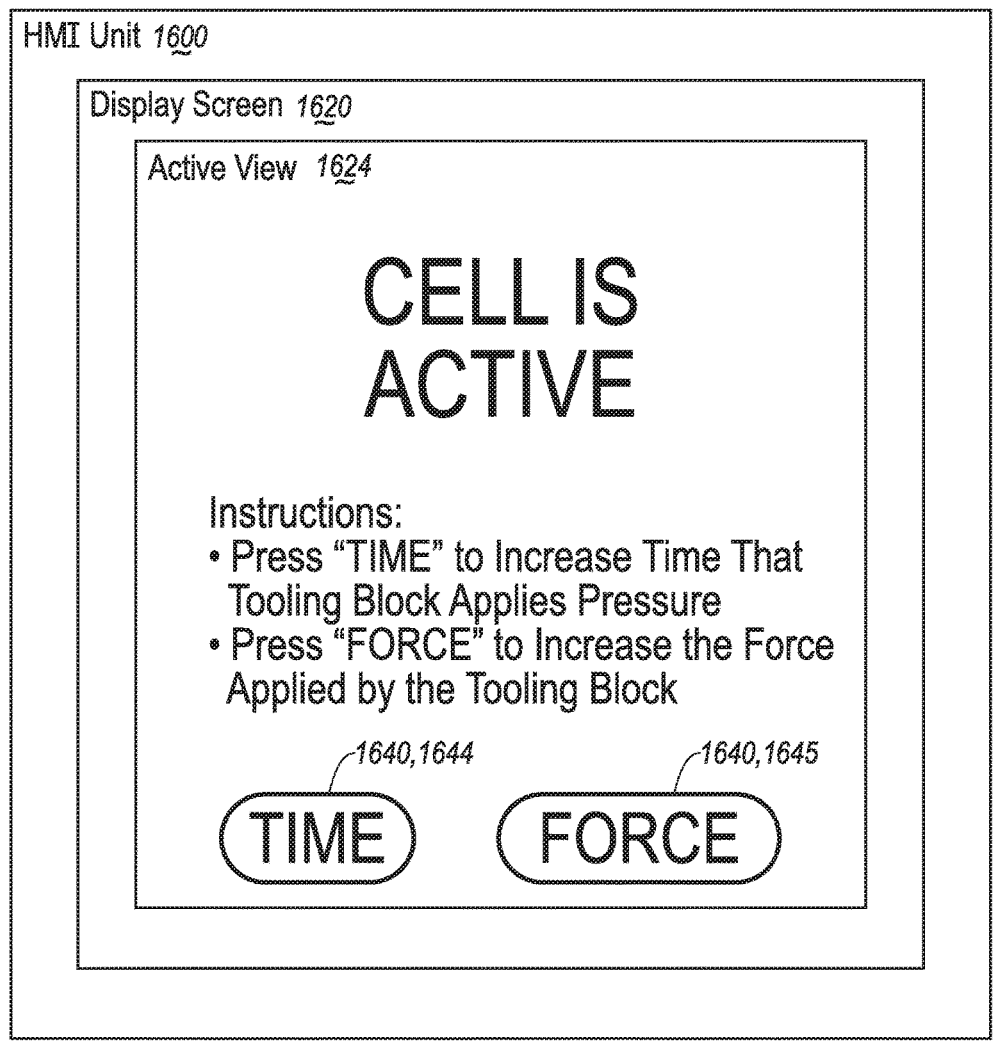
Figure 19:
Figure 22:
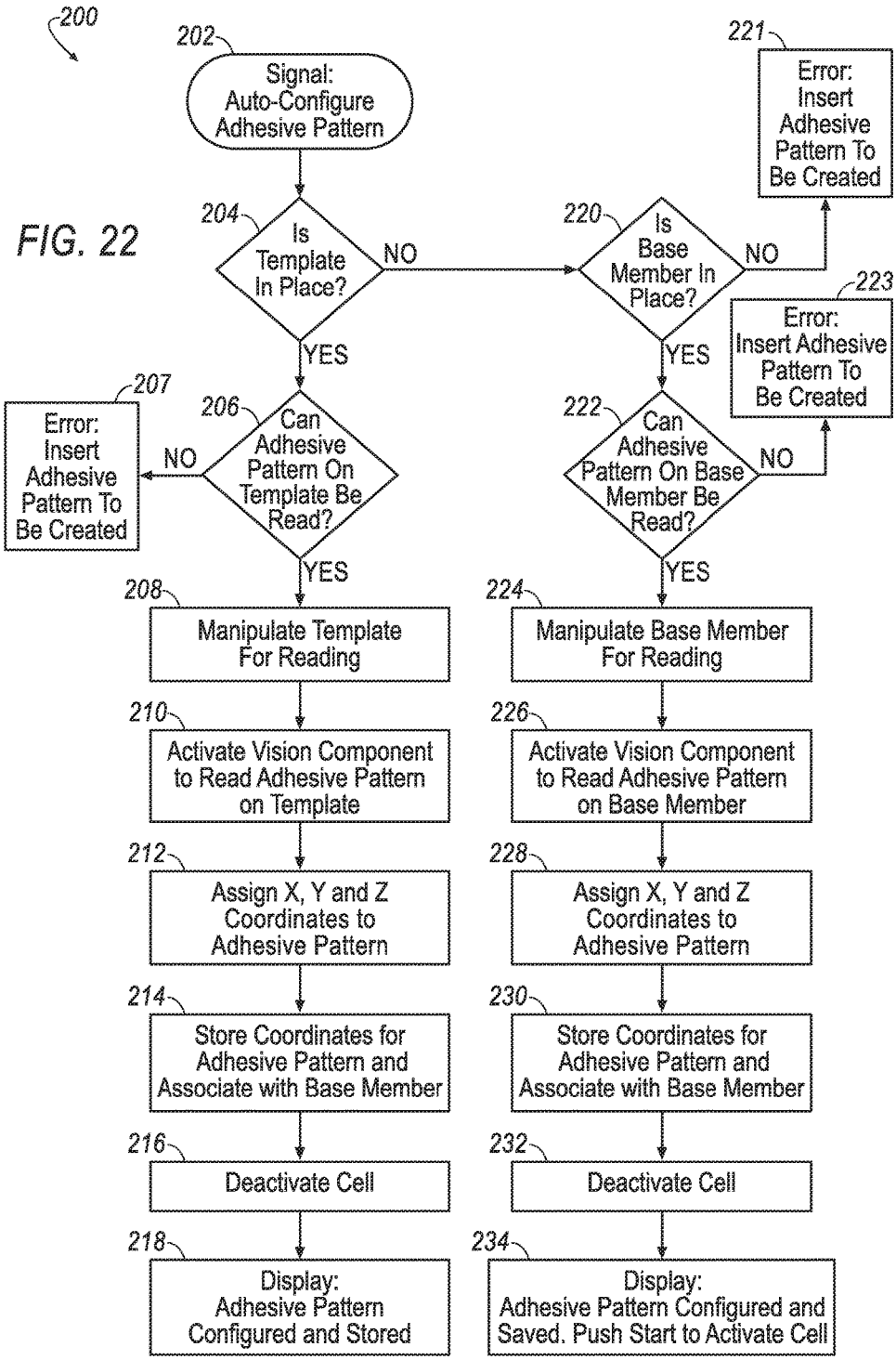
FIG. 22 is a logic flow diagram of functionality performed by an automatic adhesive-pattern configuration system of an example apparatus.
Figure 23:
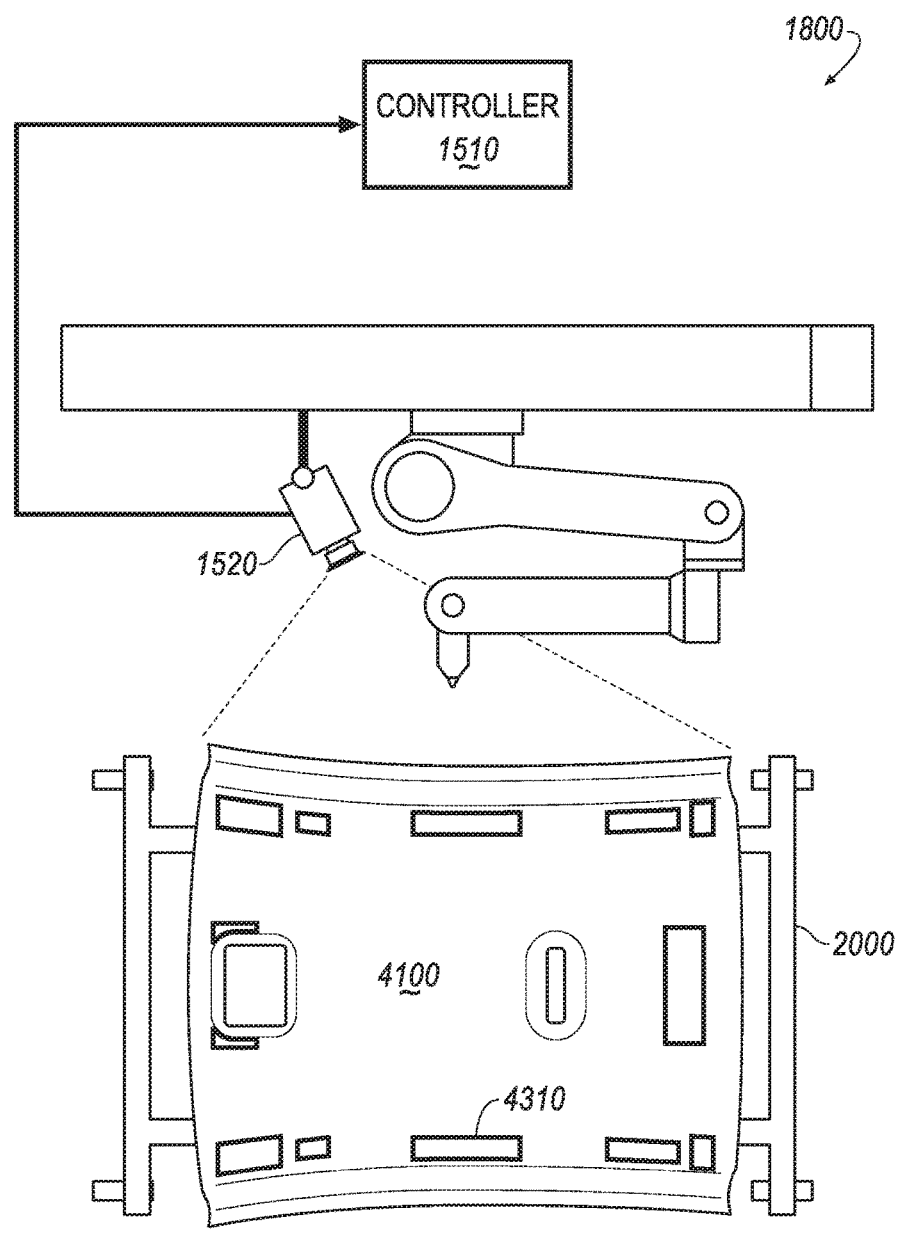
FIG. 23 is a perspective view of an example apparatus illustrating the components of the automatic adhesive-pattern configuration system of FIG. 22.

Referring to FIGS. 17-19, the HMI unit 1600 includes a display screen 1620 (e.g., liquid-crystal display (LCD), touch display screen, etc.) that displays one or more views, some of which may include one or more user interface buttons 1640. FIG. 17 illustrates an example ready view 1622. The ready view 1622 includes a 'GO' button 1642, which allows an operator to initiate the process for building a product with a base member 4100 and one or more attaching members 4200. The ready view 1622 also includes a 'CONFIGURE' button 1643, which allows an operator to initiate the process for reading and storing an adhesive pattern 4310, as described hereinafter and as illustrated in FIGS. 22-23.

FIG. 18 illustrates an example active view 1624. The active view 1624 includes a 'TIME' button 1644, which allows an operator to adjust the preset time for which the tooling block 1400 applies a force onto the one or more attaching members 4200 to adhere the one or more attaching members 4200 to the base member 4100. The active view 1624 also includes a 'FORCE' button 1645, which allows an operator to adjust the preset level of force which the tooling block 1400 applies to the one or more attaching members 4200 to adhere the one or more attaching members 4200 to the base member 4100.

Figure 21A:
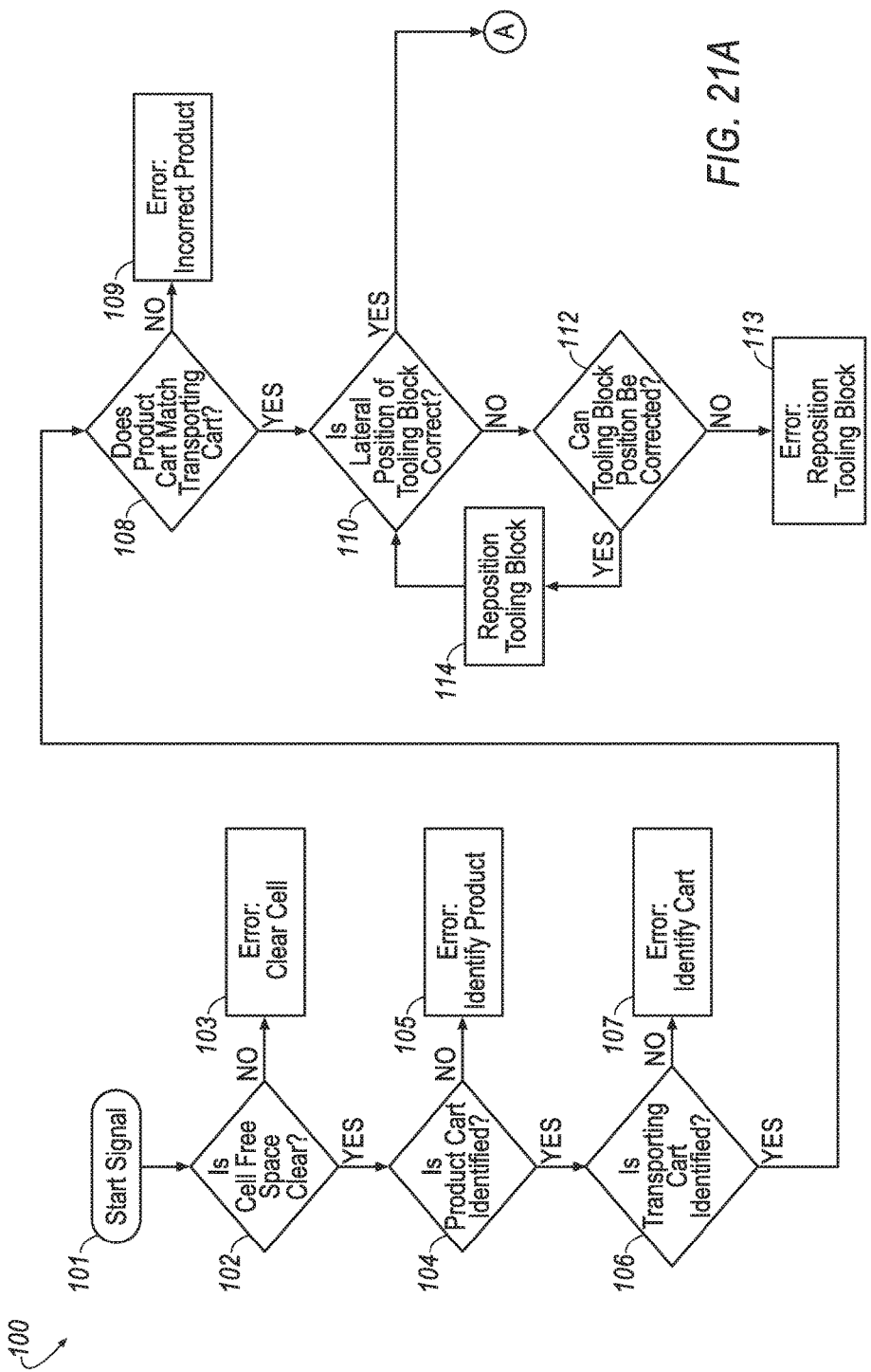
FIGS. 21A-21B are logic flow diagrams of functionality performed by a control system of an example apparatus.
Figure 21B:
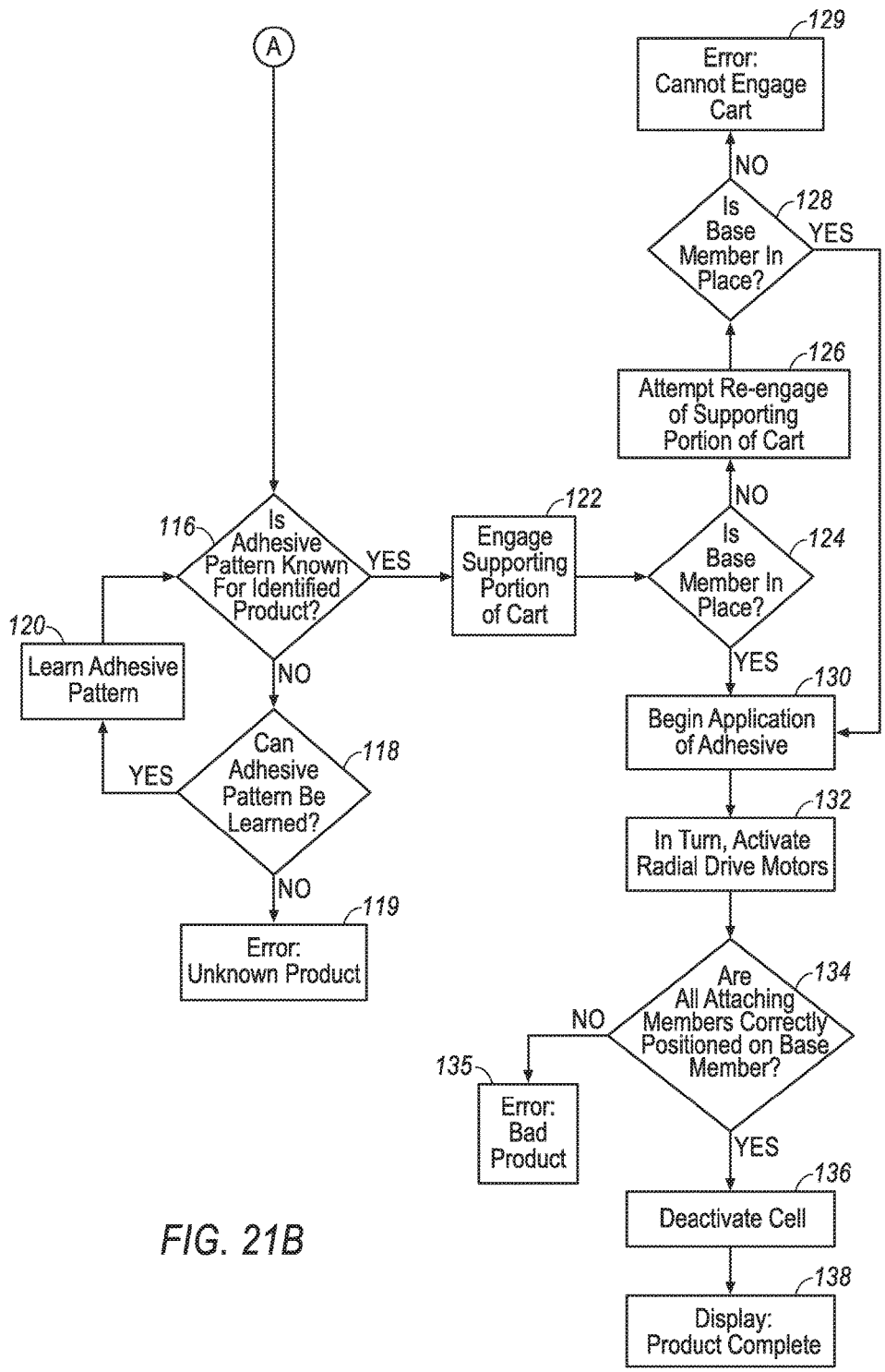

FIG. 19 illustrates an example error view 1626. The error view 1626 informs an operator of an error that has occurred during activation of the cell 1000 and includes a 'CONTINUE' button 1646, which allows an operator to re-activate the cell 1000 after the error has been corrected. The HMI unit 1600 associated with a single cell 1000 may have multiple differing error views 1626. FIGS. 21A, 21B, and 22 provide other example messages that may appear in an error view 1626.

The views illustrated in FIGS. 17-19 are non-exclusive. Other views may appear on the display screen 1620 of the HMI unit 1600. Additionally, the ready view 1622, the active view 1624, and the error view 1626 may vary depending on the specific design on the cell 1000.

Figure 20:
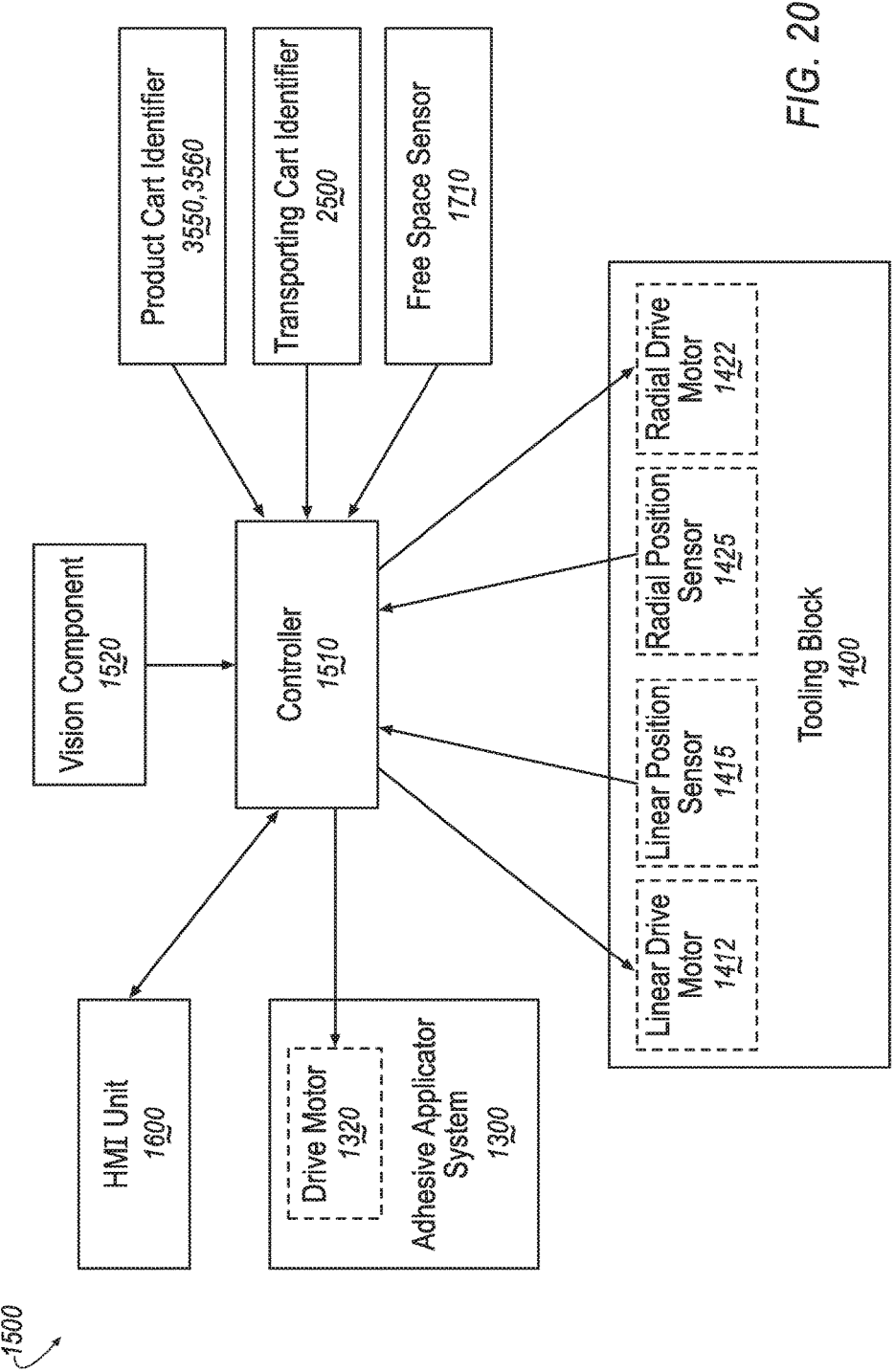
FIG. 20 is a block diagram illustrating a control system of an example apparatus.

Referring to FIG. 20, the control system 1500 of the cell 1000 may include a controller 1510 that sends control signals to the adhesive applicator system 1300 and its drive motor 1320, to the linear drive motor 1412 of the tooling block 1400, and to the rotary drive motor 1422 of the tooling block 1400. The controller 1510 may also receive monitoring signals from the vision component 1520, from the product cart identifier 3550, 3560, from the transporting cart identifier 2500, from the free space sensor 1710, from the linear position sensor 1415 of the tooling block 1400, and from the radial position sensor 1425 of the tooling block 1400. The controller 1510 may also communicate with the HMI unit 1600 to control the view appearing on the display screen 1620 and to receive control signals from the operator through the HMI unit 1600. The control and monitoring signals communicated between the controller 1510 the various components may vary in alternate implementations of the invention to omit some of the signals shown in FIG. 20 or to add additional signals not shown in FIG. 20.

The control and monitoring signals may be communicated through a hard communication line or they may be communicated utilizing a wireless communication signal, such as a radio signal.

FIGS. 21A and 21B illustrate the logic flow 100 of an example control system 1500 associated with an example cell 1000. Alternate implementations of the control system 1500 may include additional steps not illustrated in FIGS. 21A and 21B or may omit steps illustrated in FIGS. 21A and 21B. An operator initiates the process for building a product with a base member 4100 and one or more attaching members 4200 by providing the system with a start signal 101.

At decisional diamond 102, the control system 1500 determines whether the cell free space is clear. If not, then the control system 1500 indicates an error 103, which may be displayed on the display screen 1620 of the HMI unit 1600. If the cell free space is clear, then the control system 1500 advances to decisional diamond 104. To determine whether the cell free space is clear, the control system 1500 receives a signal from the free-space sensor 1710 as previously described.

At decisional diamond 104, the control system 1500 determines whether the product cart 3000 is identified. If not, then the control system 1500 indicates an error 105, which may be displayed on the display screen 1620 of the HMI unit 1600. If the product cart 3000 is identified, then the control system 1500 advances to decisional diamond 106. To determine whether the product cart 3000 is identified, the control system 1500 receives a signal from the product cart 3000 identifier, such as a barcode scanner 3550 or a set of binary switches 3560, as previously described. This step provides an additional assurance that the correct quick-disconnect tooling 1445 is connected to the one or more tooling blocks 1400 and that the correct one or more attaching members 4200 corresponding to the base member 4100 being handled by the cell 1000 are loaded onto the quick-disconnect tooling 1445.

At decisional diamond 106, the control system 1500 determines whether the transporting cart 2000 is identified. If not, then the control system 1500 indicates an error 107, which may be displayed on the display screen 1620 of the HMI unit 1600. If the transporting cart 2000 is identified, then the control system 1500 advances to decisional diamond 108. To determine whether the transporting cart 2000 is identified, the control system 1500 receives a signal from the transporting cart identifier 2500 as previously described. This step assures that the control system 1500 can set the cell 1000 to operate on the particular base member 4100 that has entered the cell 1000. For example, the control system 1500 must provide the adhesive applicator system 1300 with the adhesive pattern 4310 associated with the particular base member 4100.

At decisional diamond 108, the control system 1500 determines whether the product cart 3000 matches the transporting cart 2000. If not, then the control system 1500 indicates an error 109, which may be displayed on the display screen 1620 of the HMI unit 1600. If the product cart 3000 does match the transporting cart 2000, then the control system 1500 advances to decisional diamond 110. This step assures that the tooling block 1400 applies the corresponding one or more attaching members 4200 to the base member 4100. By assuring that the product cart 3000 matches the transporting cart 2000, the probability that incorrect attaching members 4200 are applied to the base member 4100 decreases.

At decisional diamond 110, the control system 1500 determines whether the lateral position of the tooling block 1400 is correct. If not, then the control system 1500 advances to decisional diamond 112. If the lateral position of the tooling block 1400 is correct, then the control system 1500 advances to decisional block 116. To determine whether the lateral position of the tooling block 1400 is correct, the control system 1500 receives a signal from the linear position sensor 1415 as described previously and compares the present linear position of the tooling block 1400 with a known linear position corresponding to the particular base member 4100 being handled by the cell 1000. This step assures that the tooling block 1400 applies the one or more attaching member 4200 to the correct location on the base member 4100. If the control system 1500 cannot determine the lateral position of the tooling block 1400 due to a failure of the linear position sensor 1415 or any other failure, then an error (not shown) is indicated by the control system 1500. If the cell 1000 includes more than one tooling block 1400, then the control system 1500 determines whether each tooling block 1400 is in the correct position for the base member 4100 being handled by the cell 1000.

The control system 1500 proceeds to decisional diamond 112 if the lateral position of the tooling block 1400 is not correct for the particular base member 4100 being handled by the cell. At decisional diamond 112, the control system 1500 determines whether the lateral position of the tooling block 1400 can be corrected. If not, then the control system 1500 indicates an error 113, which may be displayed on the display screen 1620 of the HMI unit 1600. If the lateral position of the tooling block 1400 can be corrected, then the control system 1500 advances to block 114. In some implementations of the cell 1000, such as the implementation illustrated in FIG. 14, the controller 1510 directs the linear movements of the tooling block 1400. In these implementations, the control system 1500 may be capable of correctly positioning the tooling block 1400. In alternate implementations, such as implementations where the linear movement of the tooling block 1400 is controlled manually, or if there is an error in the system for automatic linear movement of the tooling block 1400, then the control system 1500 will not be able to correct the position of the tooling block 1400.

If the control system 1500 can correct the position of the tooling block 1400, then, at block 114, the control system 1500 repositions the tooling block 1400 and advances back to decisional diamond 110.

At decisional diamond 116, the control system 1500 determines whether the adhesive pattern 4310 for the identified product is known. If not, then the control system 1500 advances to decisional diamond 118. If the adhesive pattern 4310 for the identified product is known, then the control system 1500 advances to block 122. The control system 1500 may store the adhesive pattern 4310 associated with numerous different base members 4100.

At decisional diamond 118, the control system 1500 determines whether the adhesive pattern 4310 for the identified product can be learned. If not, then the control system 1500 indicates an error 119, which may be displayed on the display screen 1620 of the HMI unit 1600. If the adhesive pattern 4310 for the identified product can be learned, then the control system 1500 advances to block 120. As discussed hereinafter and as illustrated in FIGS. 22-23, some implementations of the cell 1000 possess the ability to read sample adhesive patterns 4310, store the pattern 4310 as a series of three-dimensional coordinates, and associate the stored pattern 4310 with a particular base member 4100. In these implementations, the control system 1500 may advance to block 120. If there is an error in the system for configuring adhesive patterns 4310 or if the implementation of the cell 1000 does not include such a system, then the control system 1500 will not be able to learn the adhesive pattern 4310.

If the control system 1500 can learn the adhesive pattern 4310 associated with the particular base member 4100 being handled by the cell 1000, then, at block 120, the control system 1500 learns the adhesive pattern 4310. The process for learning the adhesive pattern 4310 is described hereinafter and illustrated in FIG. 22. After the adhesive pattern has been learned, the control system 1500 advances back to decisional diamond 116.

If the adhesive pattern 4310 for the identified product is known, then, at block 122, the control system 1500 directs the cell 1000 to engage the supporting portion of the transporting cart 2000. As previously described, the cell 1000 may utilize a datum reference frame that locates the base member 4100 within the cell 1000 and guides the one or more support arms 1210 to engage the supporting portion 2100 of the transporting cart 2000 which supports the base member 4100. After the cell 1000 has engaged the supporting portion 2100 of the transporting cart 2000, the control system 1500 advances to decisional diamond 124.

At decisional diamond 124, the control system 1500 determines whether the base member 4100 is in place to receive the one or more attaching members 4200 from the one or more tooling blocks 1400. If not, then the control system 1500 advances to block 126. If the base member 4100 is in place to receive the one or more attaching members 4200 from the one or more tooling blocks 1400, then the control system 1500 advances to block 130. To determine whether the base member 4100 is in place to receive the one or more attaching members 4200 from the one or more tooling blocks 1400, the control system 1500 receives a signal from vision component 1520. The control system 1500 may utilize the datum reference frame to compare the location of the base member 4100 with a known satisfactory location for the base member 4100 within the cell 1000.

If the base member 4100 is not in place to receive the one or more attaching members 4200 from the one or more tooling blocks 1400, then, at block 126, the control system 1500 directs the cell 1000 to attempt to re-engage the supporting portion 2100 of the transporting cart 2000. This step is similar to the step at block 122. After the cell 1000 has attempted to re-engage the supporting portion 2100 of the transporting cart 2000, the control system 1500 advances to decisional diamond 128.

At decisional diamond 128, the control system 1500 determines whether the base member 4100 is in place to receive the one or more attaching members 4200 from the one or more tooling blocks 1400. If not, then the control system 1500 indicates an error 129, which may be displayed on the display screen 1620 of the HMI unit 1600. If the base member 4100 is in place to receive the one or more attaching members 4200 from the one or more tooling blocks 1400, then the control system 1500 advances to block 130. This step is similar to the step at decisional diamond 124.

If the base member 4100 is in place to receive the one or more attaching members 4200 from the one or more tooling blocks 1400, then, at block 130, the control system 1500 directs the adhesive applicator system 1300 to begin application of the adhesive 4300 along the pattern 4310 associated with the particular base member 4100 being handled by the cell 1000. After the control system 1500 directs the adhesive applicator system 1300 to begin application of the adhesive 4300, the control system 1500 advances to block 132.

At block 132, the control system 1500 activates the one or more rotary drive motors 1422 associated with the one or more tooling blocks 1400. Each rotary drive motor 1422 is activated after the adhesive applicator system 1300 has applied the adhesive 4300 onto which the tooling block 1400 applies its one or more attaching members 4200 as previously described. After each rotary drive motor 1422 has been activated and returned to its disengaged position, the control system 1500 advances to decisional diamond 134.

At decisional diamond 134, the control system 1500 determines whether all of the one or more attaching members 4200 are correctly positioned upon and attached to the base member 4100. If not, then the control system 1500 indicates an error 135, which may be displayed on the display screen 1620 of the HMI unit 1600. If all of the one or more attaching members 4200 are correctly positioned upon and attached to the base member 4100, then the control system 1500 advances to block 136. To determine whether all of the one or more attaching members 4200 are correctly positioned upon and attached to the base member 4100, the control system 1500 receives an image signal from the vision component 1520 and compares the image of the finished product 4000 with a known image of a satisfactorily assembled finished product 4000 as previously described.

At block 136, the control system 1500 deactivates the cell 1000. After deactivating the cell 1000, the control system 1500 advances to block 138.

At block 138, the control system 1500 displays a product complete view on the display screen 1620 of the HMI unit 1600.

FIGS. 22-23 illustrate an example system 1800 for automatically configuring an adhesive pattern 4310 that is to be associated with a particular base member 4100. Certain implementations of the cell 1000, but not all implementations, may include this auto-configuration system 1800.

FIG. 22 specifically illustrates the logic flow 200 of an example auto-configuration system 1800 associated with an example cell 1000. The operator initiates the auto-configuration process by providing the system 1800 with a start signal 202.

At decisional diamond 204, the system 1800 determines whether a template is in place for the system to read its adhesive pattern 4310. If not, then the system 1800 advances to decisional diamond 220. If a template is in place for the system 1800 to read its adhesive pattern 4310, then the system 1800 advances to decisional diamond 206. To determine whether a template is in place, the system 1800 receives a signal from the vision component 1520 as described hereinafter and as illustrated in FIG. 23. The system differentiates a template, which will not be handled to create a finished product 4000, from a base member 4100. The adhesive pattern 4310 on the template may consist of ink, adhesive, or any other material recognized by the vision component 1520.

At decisional diamond 220, the system 1800 determines whether a base member 4100 is in place for the system to read its adhesive pattern 4310. If not, then the system 1800 indicates an error 221, which may be displayed on the display screen 1620 of the HMI unit 1600. If the base member 4100 is in place for the system 1800 to read its adhesive pattern 4310, then the system 1800 advances to decisional diamond 222. To determine whether a base member 4100 is in place, the system 1800 receives a signal from the vision component 1520 as described hereinafter and as illustrated in FIG. 23. The system differentiates a base member 4100, which may be handled by the cell 1000 to create a finished product 4000, from a template. The adhesive pattern 4310 to be read on the base member 4100 may consist of ink, adhesive, or any other material recognized by the vision component 1520. If the adhesive pattern 4310 to be read consists of an adhesive, then the control system 1500 of the cell 1000 will bypass block 130 illustrated on FIG. 21B when handling the base member 4100. If the adhesive pattern 4310 to be read consists of ink or another non-adhesive material, then the control system 1500 of the cell 1000 may handle the base member 4100 as described in FIGS. 21A and 21B after the adhesive pattern 4310 has been configured by the system 1800.

In some implementations of the cell 1000 that include an auto-configuration system 1800, the system 1800 does not differentiate between a template with an adhesive pattern 4310 to be read and a base member 4100 with an adhesive pattern to be read 4310. In these implementations, the system 1800 detects whether either a template or a base member 4100 is in place and handles decisional diamonds 204 and 220 in a single step.

At decisional diamonds 206 and 222, the system 1800 determines whether the vision component 1520 can read the adhesive pattern 4310 on the template (diamond 206) or the base member 4100 (diamond 222). If not, then the system 1800 indicates an error 207, 223, which may be displayed on the display screen 1620 of the HMI unit 1600. If the system 1800 determines that the vision component 1520 can read the adhesive pattern 4310 on the template or base member 4100, then the system 1800 advances to blocks 208, 224.

At blocks 208, 224, the system 1800 manipulates the template (block 208) or the base member 4100 (block 224) to allow the vision component 1520 to accurately recognize the adhesive pattern 4310. The system 1800 may accomplish this manipulation of the template or base member 4100 similarly to the engagement of a base member 4100 by the one or more support arm 1210 of the cell 1000 prior to activation of the adhesive applicator system 1300, as previously described. After manipulating the template or base member 4100, the system 1800 advances to blocks 210, 226.

At blocks 210, 226, the system 1800 activates the vision component 1520 to read the adhesive pattern 4310 on the template (block 210) or on the base member 4100 (block 226). After the vision component has read the adhesive pattern 4310, the system 1800 advances to blocks 212, 228.

At blocks 212, 228, the system 1800 assigns x, y, and z coordinates to the adhesive pattern 4310. After assigning coordinates, the system 1800 advances to blocks 214, 230.

At blocks 214, 230, the system 1800 stores the coordinates for the adhesive pattern 4310 and associates the adhesive pattern 4310 with a particular base member 4100. After storing the adhesive pattern 4310, the system 1800 advances to blocks 216, 232.

At blocks 216, 232, the system 1800 deactivates the cell 1000. The system 1800 has completed the auto-configuration of the adhesive pattern 4310. After deactivating the cell 1000, the system 1800 proceeds to blocks 218, 234.

At blocks 218, 234, the system 1800 displays a view on the display screen 1620 of the HMI unit 1600 to report to an operator that the system 1800 has completed the auto-configuration of the adhesive pattern 4310.

Turning to FIG. 23, the auto-configuration system 1800 auto-configures an adhesive pattern 4310. The transporting cart 2000 transports a particular base member 4100 into the cell 1000. The controller 1510 may not recognize the particular base member 4100, the controller 1510 may recognize the particular base member 4100 but may not yet associate an adhesive pattern 4310 with the particular base member 4100, or an operator may wish to change the adhesive pattern 4310 associated with the particular base member 4100.

The new adhesive pattern 4310 for the system 1800 to associate with the particular base member 4100 is drawn onto the base member with ink, adhesive, or any other material recognized by the vision component 1520. The vision component 1520 reads the new adhesive pattern 4310 and communicates an image signal to the controller 1510, which assigns x, y, and z coordinates to the adhesive pattern 4310, stores the coordinates for the adhesive pattern 4310, and associates the adhesive pattern 4310 with the particular base member 4100.

Figure 24:
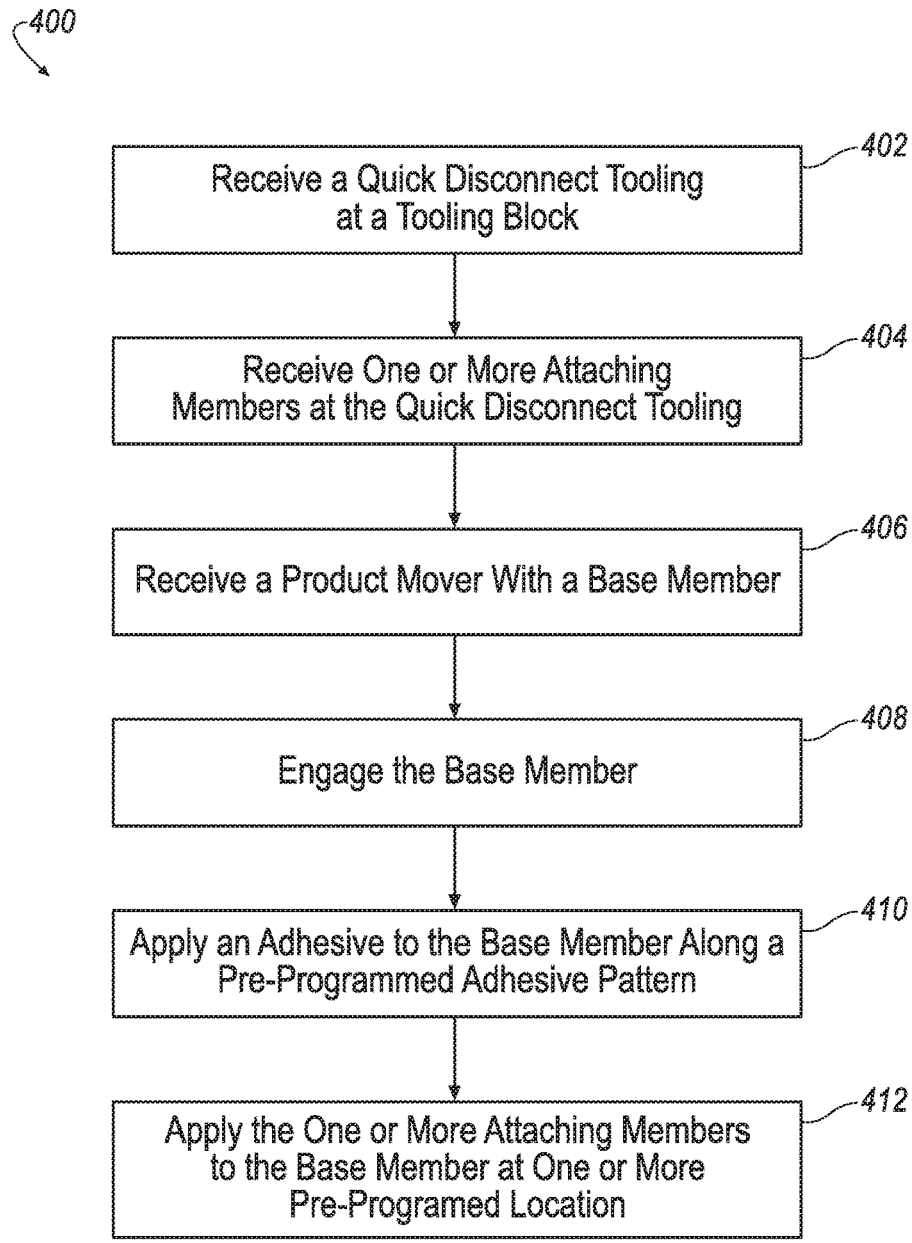
FIG. 24 is schematic view of an exemplary arrangement of operations for adhering one or more attaching member to a base member.

FIG. 24 illustrates an exemplary arrangement of operations 400 for building a product with a base member 4100 and one or more attaching members 4200. The method includes receiving a quick-disconnect tooling at a tooling block at 402 and receiving one or more attaching members at the quick-disconnect tooling at 404. The method additionally includes receiving a product mover with a base member at 406 and engaging the base member at 408. And the method includes applying an adhesive to the base member along a pre-programmed adhesive pattern at 410 and applying the one or more attaching members to the base member at one or more pre-programmed location 412.

A number of implementations have been described. Nevertheless, it will be understood that various modifications may be made without departing from the spirit and scope of the disclosure. Accordingly, other implementations are within the scope of the following claims.

What is claimed is:

1. A method of building products, comprising:
releasably-connecting a first quick-disconnect tooling of a plurality of quick-disconnect tooling at a tooling block;
receiving a first set of one or more attaching members at the first quick-disconnect tooling;
receiving a first base member at a product mover;
applying an adhesive to the first base member along a first pre-programmed adhesive pattern; and
applying the first set of one or more attaching members to the first base member at one or more pre-programmed location.

2. The method of claim 1, further comprising:
disconnecting and subsequently releasing the first quick-disconnect tooling from the tooling block;
releasably-connecting a second quick-disconnect tooling of the plurality of quick-disconnect tooling at the tooling block;
receiving a second set of one or more attaching members at the second quick-disconnect tooling;
receiving a second base member at the product mover or receiving the second base member at a second product mover;
applying the adhesive to the second base member along a second pre-programmed adhesive pattern; and
applying the second set of one or more attaching members to the second base member;
wherein at least one design aspect of the second base member differs from at least one corresponding design aspect of the first base member.

3. The method of claim 2, wherein each of the first base member and the second base member are automobile headliners.

4. The method of claim 3, wherein each of the first set of one or more attaching members and the second set of one or more attaching members includes sets of one or more head impact countermeasures.

5. The method of claim 1, wherein the tooling block includes one or more quick-disconnect levers, wherein the method further includes:
arranging the one or more quick-disconnect levers in one of:
an engaged orientation for
releasably-connecting the first quick-disconnect tooling with the tooling block; and
a disengaged orientation for
releasably-disconnecting the first quick-disconnect tooling with the tooling block.

6. The method of claim 5, wherein the tooling block includes a keyed component, wherein the method further includes:
engaging a corresponding keyed component of the first quick-disconnect tooling for
facilitating releasable connection of the first quick-disconnect tooling with the tooling block.

7. The method of claim 1, wherein the product mover further includes:
    a base member identification portion.

8. The method of claim 7, wherein the base member identification portion includes:
    a barcode, wherein the method further includes:
        optically reading the barcode with a scanner for identifying first base member that is received by the product mover.

9. The method of claim 7, wherein the base member identification portion includes:
    at least one identification peg extending from the product mover, wherein the method further includes:
        physically interfacing the at least one identification peg with at least one binary switch for identifying first base member that is received by the product mover.

* * * * *